(12) United States Patent
Ahl

(10) Patent No.: US 11,178,825 B2
(45) Date of Patent: Nov. 23, 2021

(54) STACKABLE TRELLIS SUPPORT SYSTEM

(71) Applicant: Michael Ahl, Grass Valley, CA (US)

(72) Inventor: Michael Ahl, Grass Valley, CA (US)

(73) Assignee: Michael Lewis Ahl, Corbett, OR (US)

( * ) Notice: Subject to any disclaimer, the term of this patent is extended or adjusted under 35 U.S.C. 154(b) by 170 days.

(21) Appl. No.: 16/191,272

(22) Filed: Nov. 14, 2018

(65) Prior Publication Data

US 2020/0146223 A1    May 14, 2020

(51) Int. Cl.
*A01G 17/06*       (2006.01)
*A01G 9/12*        (2006.01)
*F16B 7/04*        (2006.01)
*A01G 22/05*       (2018.01)

(52) U.S. Cl.
CPC ............. *A01G 17/06* (2013.01); *A01G 9/12* (2013.01); *A01G 22/05* (2018.02); *F16B 7/042* (2013.01); *F16B 7/0446* (2013.01)

(58) Field of Classification Search
CPC ........ A01G 9/12–128; A01G 17/04–10; A01G 22/05; A01G 13/0237; A01G 13/0212; F16B 7/0446; F16B 7/042
See application file for complete search history.

(56) References Cited

U.S. PATENT DOCUMENTS

| | | | |
|---|---|---|---|
| 4,858,380 A * | 8/1989 | Gayle ................ | A01G 13/0237 47/45 |
| 4,922,653 A * | 5/1990 | Stone .................... | A01G 17/04 47/45 |
| 5,647,166 A * | 7/1997 | Neff ......................... | A01G 9/12 256/32 |
| 5,711,107 A * | 1/1998 | Louisiana .............. | A01G 17/06 47/45 |
| 6,311,428 B1 * | 11/2001 | Marino ..................... | A01G 9/12 256/65.05 |
| 8,813,422 B1 * | 8/2014 | Laudenklos ............. | A01G 9/12 47/47 |
| 10,617,069 B2 * | 4/2020 | MacDonald ............. | A01G 9/12 |
| 2006/0206239 A1 * | 9/2006 | Christiansen .......... | A01G 25/16 700/284 |
| 2009/0206046 A1 * | 8/2009 | Lunato ..................... | A01G 9/02 211/85.18 |
| 2009/0320359 A1 * | 12/2009 | Hertlein ................. | A01G 9/122 47/47 |
| 2011/0197505 A1 * | 8/2011 | Hansen .................... | A01G 9/12 47/65.8 |

(Continued)

*Primary Examiner* — Kevin R Kruer

(57) ABSTRACT

The stackable trellis support system of the present invention comprises base and main trellis assemblies having wire mesh over the horizontal wire mesh frame assembly. The base trellis assembly allows additional sections to be added to the system, utilizing four main post apparatuses for connecting each trellis assembly. Any number of main trellis assemblies may be connected using the main post apparatus to form the stackable trellis support system. The base trellis assembly can be anchored in soil/ground using anchored rebar stakes to which the base post apparatus slides over and attaches, using locking bolts, allowing the height of base trellis assembly to be adjustable along the vertical axis of said rebar stakes, and perpendicular to soil/ground. The trellis side wire panels can be hung from said wire mesh frame assembly to provide vertical support.

1 Claim, 23 Drawing Sheets

(56) References Cited

U.S. PATENT DOCUMENTS

| | | | | |
|---|---|---|---|---|
| 2012/0055083 A1* | 3/2012 | Marquez | ........... | A01G 9/12 47/45 |
| 2012/0227318 A1* | 9/2012 | Harger | ........... | A01G 9/12 47/46 |
| 2014/0196365 A1* | 7/2014 | Washington | ........... | A01G 9/02 47/66.6 |
| 2014/0305040 A1* | 10/2014 | Hall | ........... | A01G 9/1423 47/65.5 |
| 2015/0113869 A1* | 4/2015 | Brown | ........... | A01G 9/12 47/29.1 |
| 2016/0135385 A1* | 5/2016 | Wang | ........... | A01G 17/04 47/44 |
| 2017/0238478 A1* | 8/2017 | Brough | ........... | A01G 9/16 |
| 2017/0258017 A1* | 9/2017 | Scaletta | ........... | A01G 13/0206 |
| 2017/0303481 A1* | 10/2017 | Marshall | ........... | A01G 27/00 |
| 2017/0325415 A1* | 11/2017 | MacDonald | ........... | A01G 9/12 |
| 2017/0325416 A1* | 11/2017 | MacDonald | ........... | A01G 17/06 |
| 2017/0347540 A1* | 12/2017 | Sowinski | ........... | A01G 17/06 |
| 2018/0054976 A1* | 3/2018 | Uy | ........... | A01G 9/12 |
| 2018/0064038 A1* | 3/2018 | Niccoli | ........... | A01G 22/00 |
| 2018/0084736 A1* | 3/2018 | Uy | ........... | A01G 9/12 |
| 2018/0153108 A1* | 6/2018 | Villeneuve | ........... | A01G 9/128 |
| 2018/0220606 A1* | 8/2018 | Daniel | ........... | A01G 9/12 |
| 2018/0359960 A1* | 12/2018 | MacDonald | ........... | A01G 9/12 |
| 2019/0045721 A1* | 2/2019 | Glennerster | ........... | A01G 9/023 |
| 2019/0144163 A1* | 5/2019 | Lim | ........... | B65D 19/04 108/53.5 |
| 2019/0327907 A1* | 10/2019 | Ostman | ........... | H01L 25/0753 |
| 2020/0000048 A1* | 1/2020 | Daniel | ........... | A01G 9/128 |
| 2020/0015431 A1* | 1/2020 | Kirk | ........... | B62B 5/0083 |
| 2020/0120879 A1* | 4/2020 | Nicholas | ........... | E04H 17/20 |
| 2020/0178478 A1* | 6/2020 | Buruma | ........... | A01G 9/12 |
| 2020/0196540 A1* | 6/2020 | MacDonald | ........... | A01G 17/06 |
| 2020/0205352 A1* | 7/2020 | Riggs | ........... | A01G 9/02 |

\* cited by examiner

STACKABLE TRELLIS SUPPORT SYSTEM

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention relates generally to apparatus and method for supporting plant growth and more particular, to a stackable trellis support system configured to form a structural support system that can be quickly and efficiently installed and removed.

BACKGROUND OF THE INVENTION

Many systems have been provided for supporting plants during their growth, from simple stakes to which the plants are tied, to more complicated structures which support the plants without tying and through which the plants intertwine while growing. The various combinations of poles, slats, cords and wires, as well as metal, concrete and wood structures are currently in use. Most of these are not designed with the possibility of installing them and then adding support after the plant has grown.

It is often desirable for a variety of reasons to plant and grow vegetables, flowers, and other growing plants in some sort of planter structure as well as directly into the ground. Most of these are not designed with the possibility of installing them and then adding support after the plant has grown. Additionally, in gardening, it is often desirable to add structural support to unstable growing plants to support heavy vegetation, blooming flowers, fruits, or vegetables, where the weight of the flower needs to be supported above the ground. It is often desirable to place climbing plants and vines around upwardly-projecting objects such as ground-mounted lamp posts, other lawn and garden posts, poles, decorations, scarecrows, or plant stalks in order to achieve a desired aesthetic effect.

There are many structures and systems for the support of plants, trellis structures are often used to provide structural support for climbing plants, and/or as a structure for supporting heavy vegetation, blooming flowers, fruits, or vegetables. Trellises typically comprise latticework or other supporting structure that is attached to a frame. The frame serves to support the latticework and usually also includes a mounting portion that is placed partially into the ground in order to hold the trellis in place at a desired installation location.

However, it has been the practice in growing various plants, such as flowers and vines, to provide a support device made of wood and in turn fastened to the ground using wood stakes. Although treated, these wooden support devices are not fully weatherproof and thus are often subject to rot and excessive wear or splitting over a period of time. Such rot often found near the lower end of the wood support or about the stakes due to constant exposure to ground moisture.

As a result, such support devices will become out of line, tilt or even break due to winds and/or the weight of the plants. Another problem associated with growing plants, such as vegetables, flowers, or the like, has been the lack of support above the ground for support of vines, stocks or other parts of the plants as they grow above the top of the planter.

Typically, these upper parts of the plants contain the valuable fruits, vegetables or flowers, which need to be nurtured and exposed to maximum sunlight to grow adequately. Without upper support means the weight of the growing stocks and vines soon causes them to bend and ether break or hang downwardly where lack of sunlight and contact with undesirable surfaces stunts growth.

Garden vegetables and fruits can produce much higher yields when they are allowed to reach the plants' maximum height. For example, tomatoes, cucumbers, pole beans, squashes and many other vegetables may grow up to heights exceeding 8-10 feet and, in turn, will produce fruit proportionally.

Although support devices for garden vegetables are well known, current devices in the market do not provide the area to support plants to this height, nor can these devices typically accommodate multiple plants on the same support device. In addition, current gardening support devices generally lack the structural strength to support plants exceeding five feet in height.

While there are many designs that adequately support plants, many have disadvantages that reduce their usefulness by being complicated, cumbersome, unattractive for home use, difficult to assemble and disassemble, difficult to store, expensive to produce, and of limited design flexibility that does not allow for individual creative use. In addition, because of the temporary nature of the growing season in some areas, requiring the rotation or alternation of crops, it is advantageous to have growing structures that are easy to assemble, disassemble, store, and move.

Many existing trellis systems are long-term semi-permanent structures that cannot be economically removed and assembled on a seasonal basis. While different types are available, the stackable trellis apparatus have one or more of the features, including being easily and reliably used, versatile for different sizes of plants, attractive, economical to make, and preferably compact for easy marketing and storage.

It is often desirable to support the plant stalks and blooms or fruit to protect them from damage due to insects, dirt or from contact with the ground. It is also beneficial to support the blooms or fruit up higher off the ground so they are more visible.

DETAILED DESCRIPTION OF THE INVENTION

The primary object of the present invention is to meet the needs of growers and horticultural producers by providing a stackable trellis support system for the growing of flowers, fruit, and vegetables, which allows the plants to reach their maximum height and thereby produce the greatest amount of produce.

The invention comprises a stackable trellis support system having a wire mesh frame assembly over which wire mesh is spread to support plant stems and fruit to form a structurally supported growth area for unstable or climbing plants and vines. The base trellis sub-assembly is anchored in and above the ground by stabilizing main posts apparatus upon which the wire mesh frame assembly rests into a supporting material, such as soil, thereby retaining the trellis support apparatus in a desired generally vertical position. Further, the base posts apparatus of the base trellis sub-assembly has an adjustable base post, which allows the height of the frame to be freely adjustable along the vertical axis of the trellis and perpendicular to the ground.

The wire mesh fabricated from strong weather-proofed wire stretched across and attached to the wire mesh frame assembly. Further, the base trellis sub-assembly may also be adjusted according to the desired height of the plants by adding additional main trellis sub-assembly until the desired height is achieved. As a result, the invention provides a simple to use, durable and adjustable garden support device, which allows plants to grow upward, thereby maximizing available soil and ground space and providing ideal exposure to sunlight.

Upward growth also allows the plant to remain supported above the ground, thereby eliminating the risk of ground rot and greatly reducing the threat of land borne insects. In addition, by guiding garden vegetables to grow upward, rather than along the ground, the adjustable trellis promotes high efficiency gardening that reduces the amount of space needed to grow vegetables and decreases the ground area which must be weeded and fertilized in order to insure the health of the plant.

It is therefore, a primary object of the invention to allow one base trellis sub-assembly, once installed, to be expanded by using one or more main trellis sub-assembly. The post apparatus on both the base and main trellis apparatus allows additional sections to be added to the existing trellis sub-assembly, utilizing four common side post apparatuses for each of the trellis units.

In this regard, any number of individual main trellises may be connected using said posts apparatus to form any number of patterns, depending on the desired use or available area. It is a further object of the present invention to provide a multiple piece trellis support system that may include multiple plant support frames that have a width that fits within a conventional crop row bed and that support vertical growth of the selected plants. An important feature of this invention is its simplicity side wire mesh panel's generally two dimensional component pieces to define a sturdy three-dimensional trellis apparatus suited for surrounding and containing the plant.

Another important feature of this invention is the ease of interlocking the separate side wire mesh panel's relative to one another, with possible variations for adjusting to fit around different size plants.

Yet another feature of this invention is the ease and economy of fabrication of the separate component pieces, and their compactness, to allow for the economical manu-facturing and marketing of the stackable trellis support system.

Another object of the present invention is to provide a novel and improved, highly versatile, yet simple trellis support system which is quickly and readily adaptable to a variety of uses and conditions, and which may be easily disassembled for compact shipping and storage.

Still another object of the invention is to provide a selectively extensible plant support, which allows a growing plant to be positively secured against the support.

A further object of the invention is to provide a plant support, which allows irrigation of a growing plant along the length of the plant.

A still further object of the invention is to provide a simple device for providing vertical support of plants, thereby eliminating the conventional problems routinely associated with gardening. In particular, the device provides a maintenance free, vertical and horizontal support frame assembly of adjustable height to which growing plants may be attached to the gardening trellis, thereby allowing maximum upward growth of the plants while also elevating the plants.

DESCRIPTION OF CERTAIN EMBODIMENT OF THE PRESENT INVENTION

In the following detailed description of the preferred embodiment, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention provides an improved stackable trellis support system for use with low-lying row crops such as berries, tomatoes, peppers, peas, tomatoes, and the like. While there are many designs that adequately support plants, many have disadvantages that reduce their usefulness by being complicated, cumbersome, difficult to assemble and disassemble, difficult to store, expensive to produce, and of limited design flexibility that does not allow for individual creative use. In particular, the device provides maintenance free, vertical and horizontal support trellis apparatus, once installed, to be expanded by using one or more of the main trellis sub-assembly.

Figure 1:
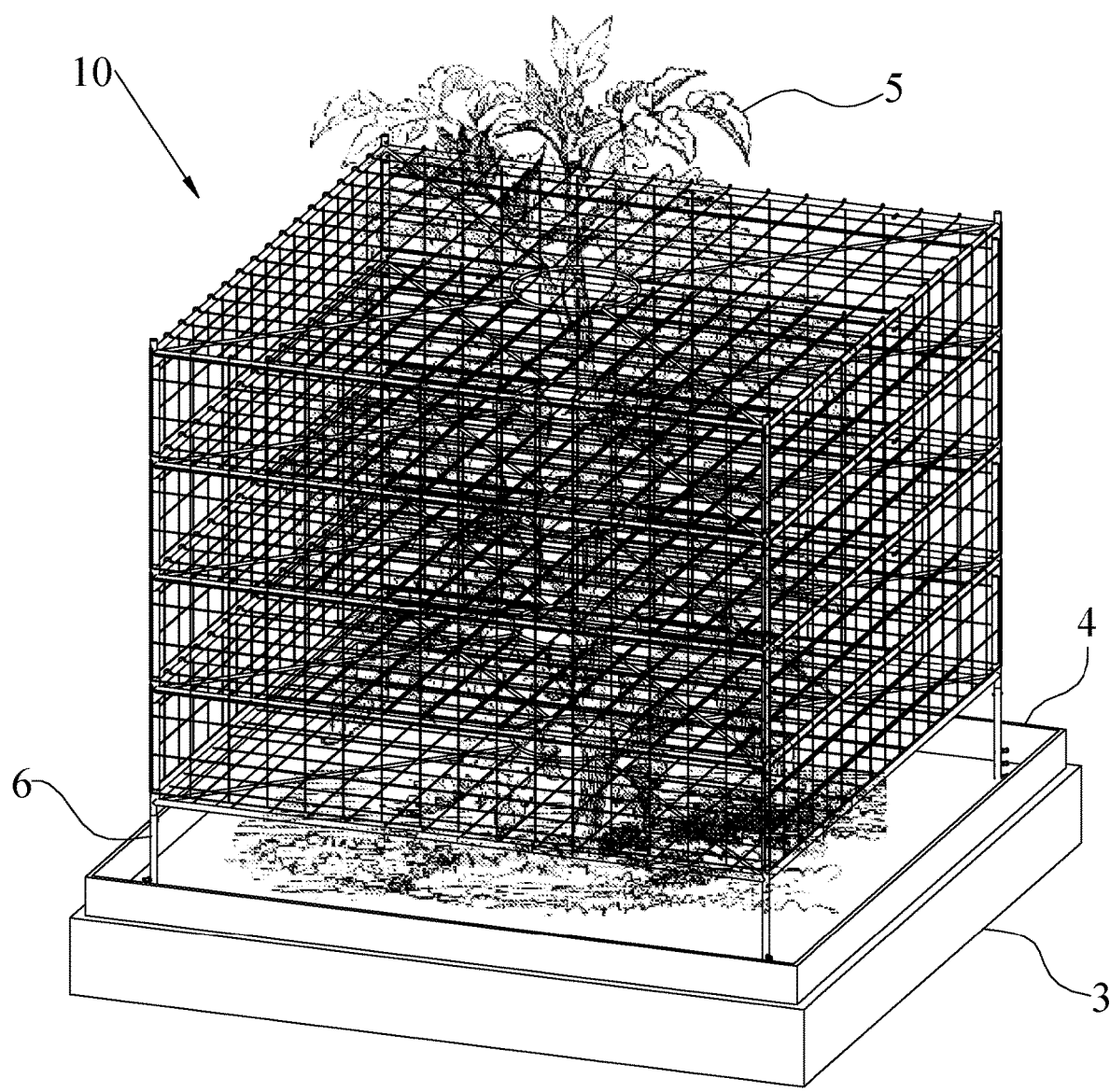
FIG. 1 is a perspective view of the stackable trellis support system in the preferred embodiment set up in one possible configuration for plant support.

The present invention shown in FIG. 1 illustrate one version of the stackable trellis support system 10 shown assembled with a tomato plant 5 and inserted into the ground 3 by base post apparatus 6 within a planter bed 4 of the present invention.

Figure 2:
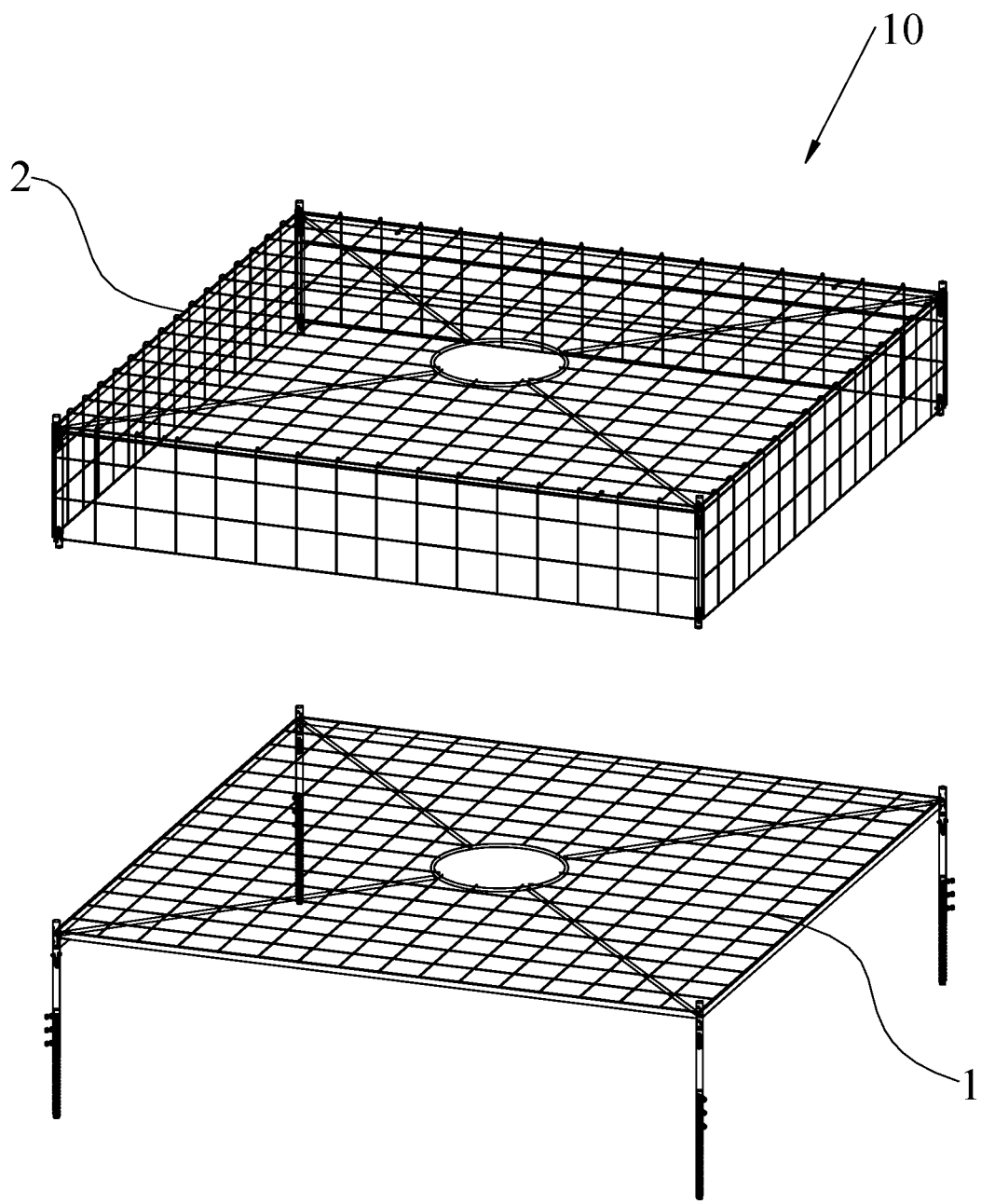
FIG. 2 is another perspective view of the stackable trellis support system of FIG. 1; comprises two main sections according to the present invention.

As shown in FIG. 2, is a perspectives view of the stackable trellis support system 10 comprises a first base trellis and a second main trellis assembly 1, 2 respectively, which are configured for removable attachment together. Although a first base trellis and second main trellis assembly 1, 2 are shown, further mating main trellis assembly 2 may be used to assemble stackable trellis support system 10, such as a third or fourth main trellis assembly 2.

Figure 3:
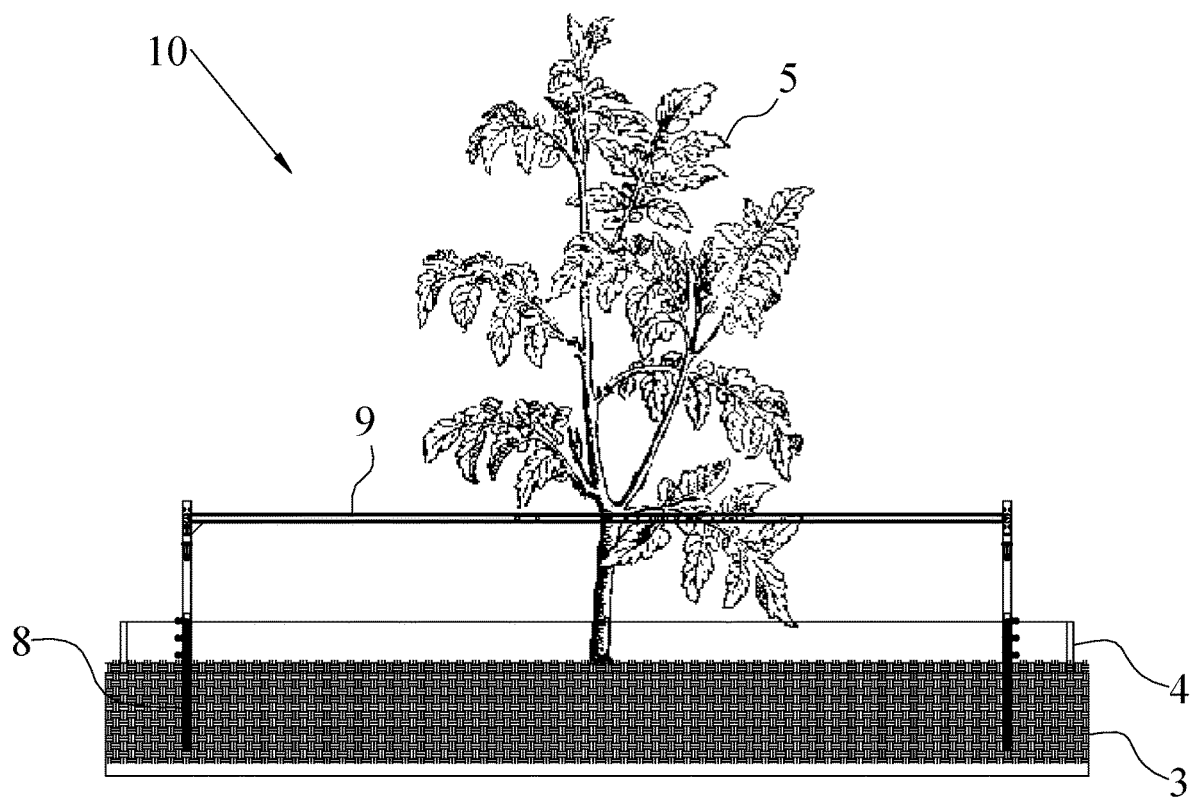
FIG. 3 is a front view of the stackable trellis support system of FIG. 1, showing the base trellis assembly of the present invention installed in the ground.

More specifically, as shown in FIG. 3, a side view of the stackable trellis support system 10 shown located within a planter bed 4 supporting a tomato plant 5 whereas four anchoring rebar stakes 8 attached to the adjustable base post apparatus 6 is embedded into the ground 3. By embedding a substantial length of the anchoring rebar stakes 8 into the ground, the base trellis assembly 1 is horizontally restrained from tripping due to lateral forces such as strong winds. As the plant grows, you can install the main trellis assembly 2 onto the base trellis assembly 1 by connecting the main post 12 to the base post apparatus 6.

Figure 4:
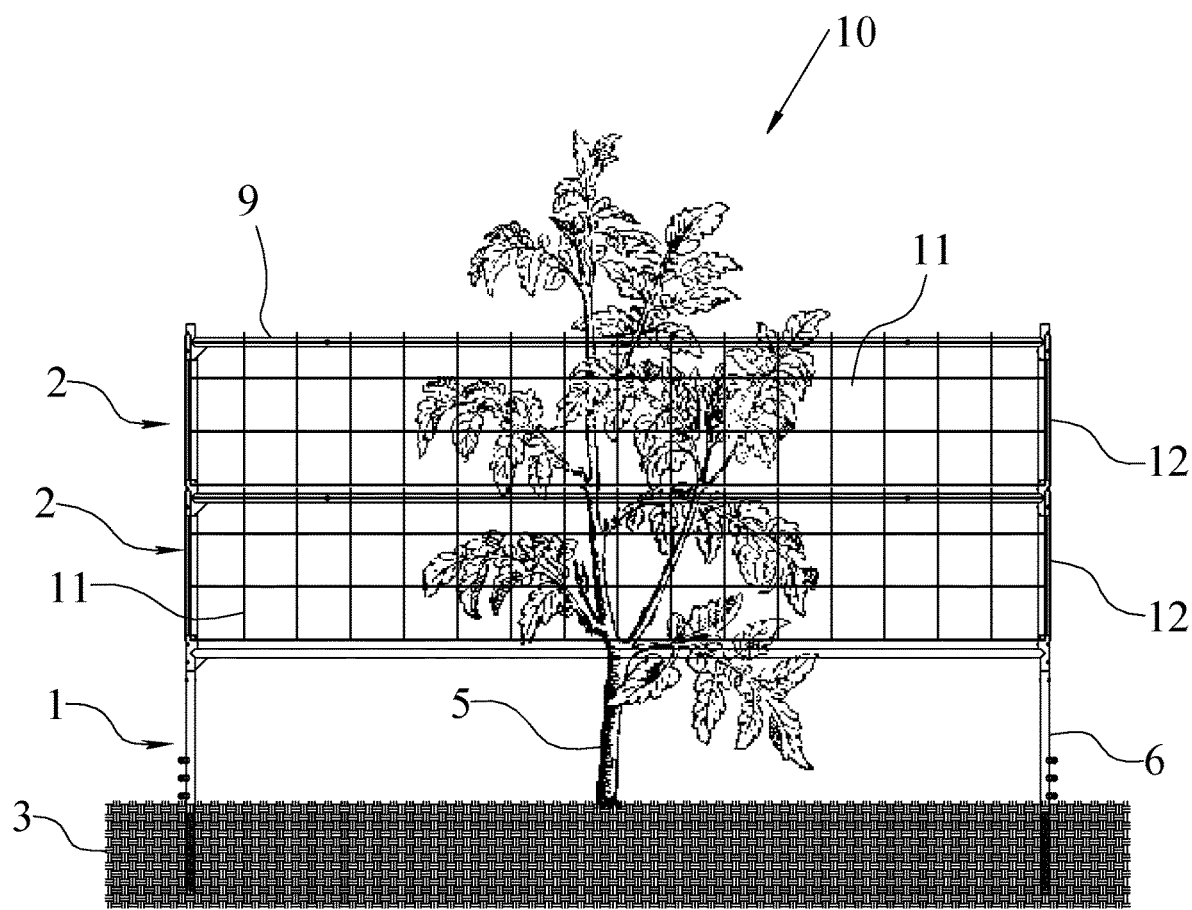
FIG. 4 is a front view of the stackable trellis support system of FIG. 1 and FIG. 3 showing the base and main trellis assembly of the present invention installed in the ground.

As substantially, shown in FIG. 4 a front view of the stackable trellis support system 10 shown with a tomato plant 5, consists of a base trellis assembly 1, having the base posts apparatus 6 embedded into the ground 3 and a main trellis assembly 2 interconnected in a stackable fashion. Each of the base trellis assembly 1 and main trellis assembly 2 includes a plurality of base post apparatus 6 and main post apparatus 12 configured to align and connect together when the end rail sleeve 14 and the bottom of the main post apparatus 12 joined together. The trellis side wire panel 11 can support plants (e.g., bell peppers, tomatoes, flowers, peas, etc.), which help the plants maintain a generally horizontal orientation during growth and help keep plant branches from breaking off. The trellis side wire panels 11 are designed for attachment at each end of the main trellis apparatus 2.

Figure 5:
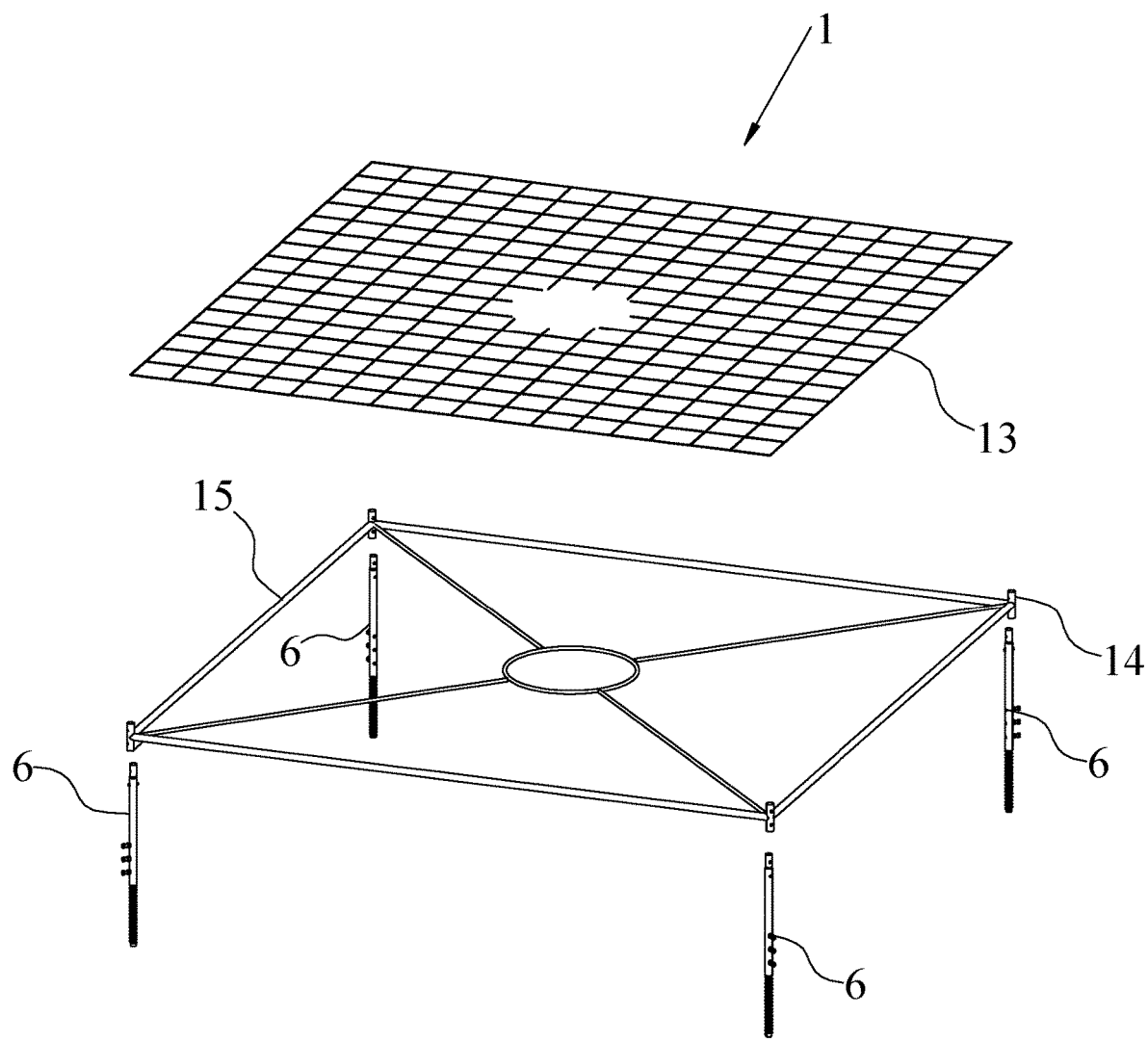
FIG. 5 is an exploded view of the base trellis assembly shown in FIG. 1.

As Shown FIG. 5, the base trellis assembly 1 and main trellis assembly 2 (not showed) is actually made up of a plurality of separate component pieces each of substantially identical except for the base post apparatus 6 and the main post apparatus 12 (not showed). The base trellis assembly 1 includes a wire mesh frame 15 having a wire mesh 13 in a square welded pattern to which the wire mesh frame 15 and wire mesh 13 which may be bonded to each other by welding, brackets, and/or other methods of securement. Located on the outside surface of the wire mesh frame 15 corners is the end rail sleeve 14 component designed to receive a base post apparatus 6 or main post apparatus 12 (not showed). The rail sleeve 14 are welded together to provide a strong connection between the wire mesh frame 15 and the base post apparatus 6.

Figure 6:
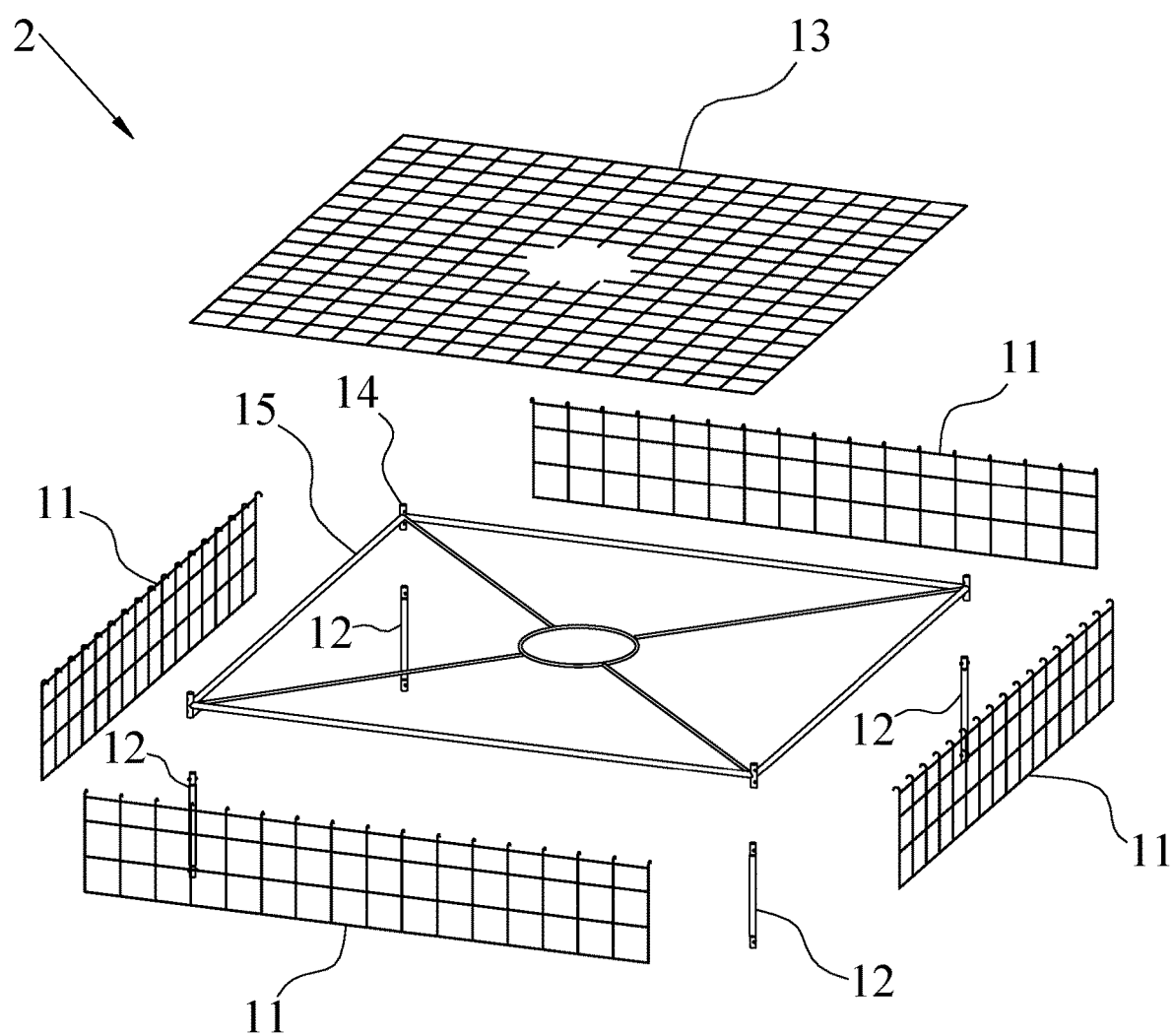
FIG. 6 is an exploded view of the main trellis assembly shown in FIG. 1.

FIG. 6 show the main trellis assembly 2 made up of a plurality of separate component pieces each of substantially identical to FIG. 5 except for the main post apparatus 12 and the trellis side wire panel 11. The main trellis assembly 1 includes a wire mesh frame 15 having a wire mesh 13 in a square welded pattern to which the wire mesh frame 15 and wire mesh 13 which may be bonded to each other by welding, brackets, and/or other methods of securement. Located on the outside surface of the wire mesh frame 15 corners is the end rail sleeve 14 component designed to receive a base post apparatus 6 (not showed) or main post apparatus 12. The end rail sleeve 14 are welded together to provide a strong connection between the wire mesh frame 15 and the main post apparatus 12.

Figure 7:
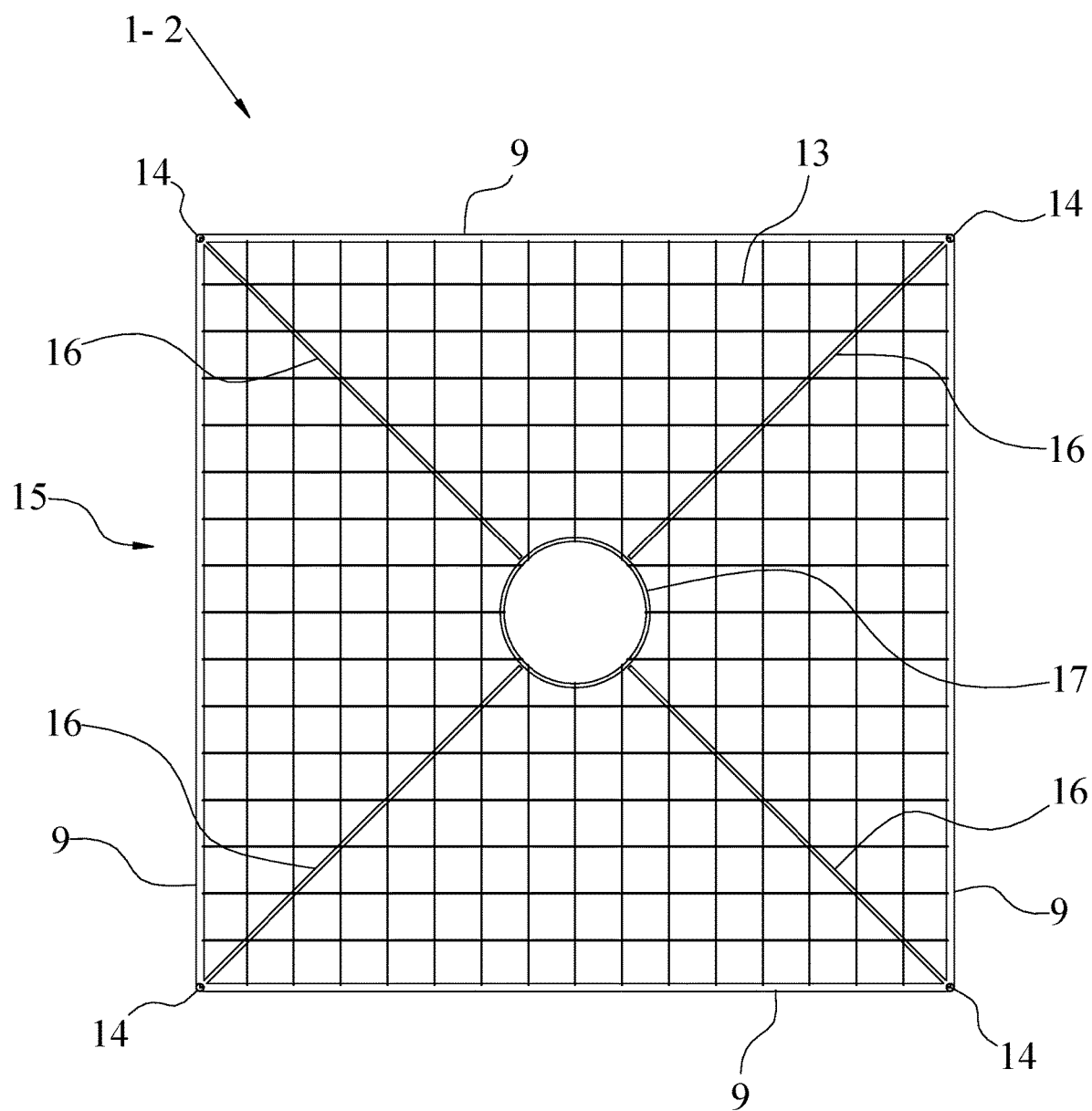
FIG. 7 is a top view of the base trellis assembly, as shown with the wire mesh attached to the wire mesh frame.

As best seen in FIG. 7, a top view of the base trellis assembly 1 and main trellis assembly 2 includes four substantially horizontal top rails 9 each having four rail end sleeves 14 and four cross rails 16 with a center ring 17 completing the wire mesh frame assembly 15. As generally understood, both the base trellis subassembly 1 and main trellis subassembly 2 include a wire mesh 13 in a square welded pattern that is attached to the wire mesh frame assembly 15. Wire mesh 13 can be of many standard types, that might be selected from light, medium or heavy gauge steel wire covered with galvanizing, an aluminum coating or a vinyl jacketing, and is in the noted illustrated pattern or in a mesh pattern to suit the particular application.

Figure 8:
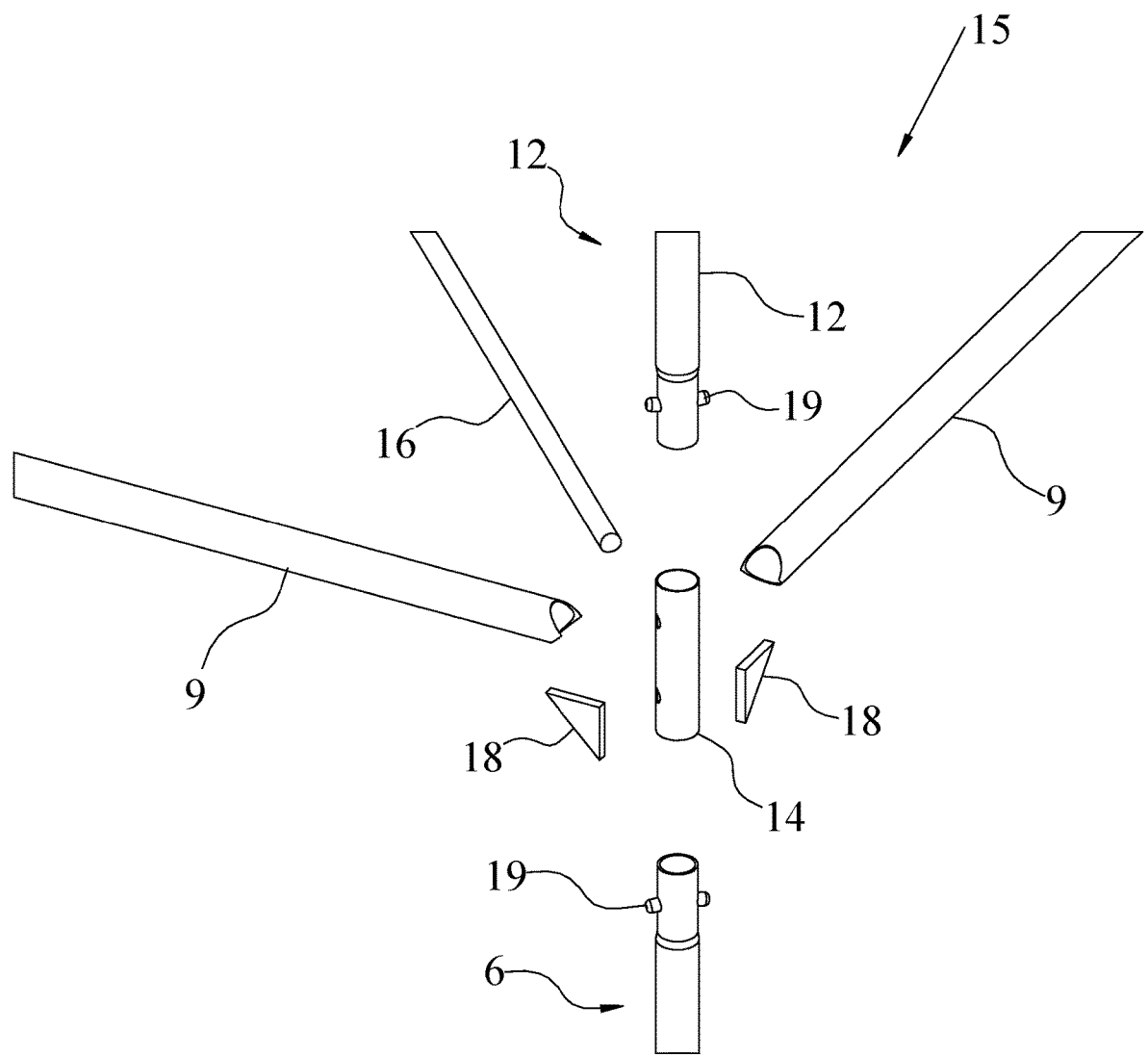
FIG. 8 is an enlarged, detail perspective view of the components of the base trellis and main trellis assembly.

More specifically, as shown in FIG. 8 an exploded view of one embodiment of the wire mesh frame 15 including two top rail 9 members at each lateral side of the end rail sleeve 14 including one cross rail 16 and two post rail gussets 18 configured to align and connects by welding them together. Each rail end sleeve 14 provides an opening for the attachment of the base post apparatus 6 and main post apparatus 12 to be bonded to each other by welding, bolts, and/or other methods of securement. In another embodiment of the present invention, the base post apparatus 6 and the main post apparatus 12 to which the main post apparatus 12 are attached and locked in by the button spring clip 19 engaged in the button spring clip hole 20.

Figure 9:
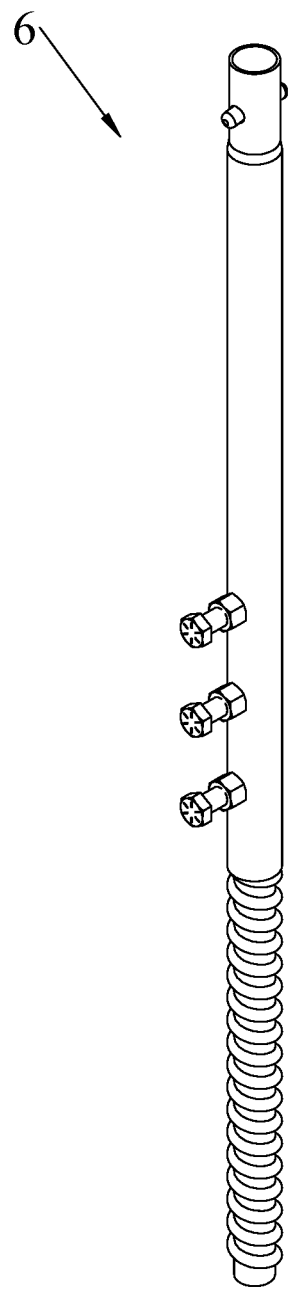
FIG. 9 is a perspective view of the base post apparatus according to the present invention.
Figure 9A:
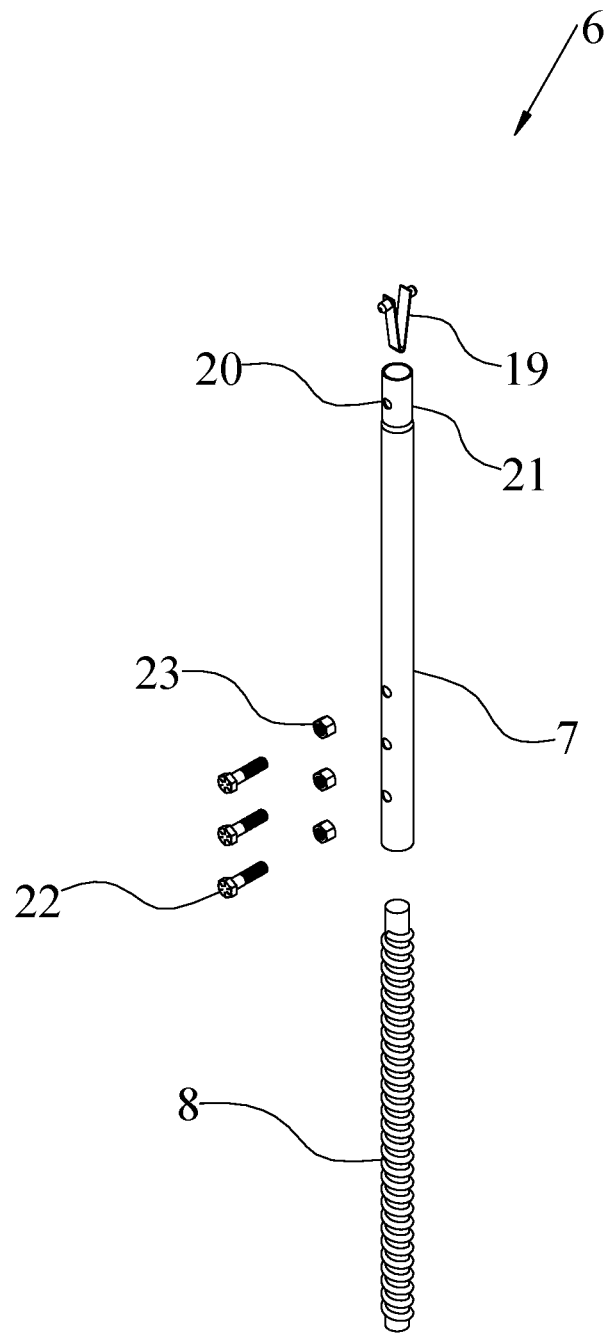
FIG. 9A is an exploded view showing detail of the components of the base post apparatus of the present invention.

As shown in FIG. 9 is a perspective view of the base post apparatus 6 whereas FIG. 9A is an exploded view of the base post apparatus 6 showing the relationship between components including adjustable base post 7, and anchoring rebar stakes 8. The anchoring rebar stakes 8 can be telescopically adjustable to a desired position using the locking Bolt 22 once inserted in the nut 23 located on the adjustable base post 7. In addition, the base post apparatus 6 can be connected or disconnected from the end rail sleeve by engaging the button spring clip 19.

Figure 10:
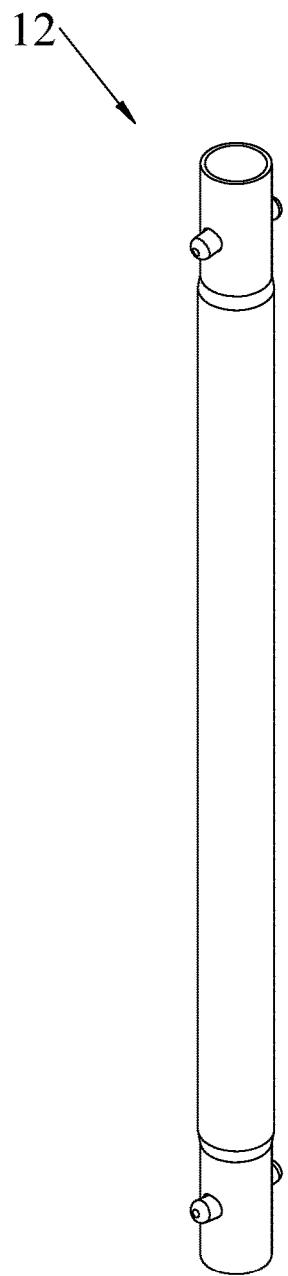
FIG. 10 is a perspective view of the main post apparatus according to the present invention.
Figure 10A:
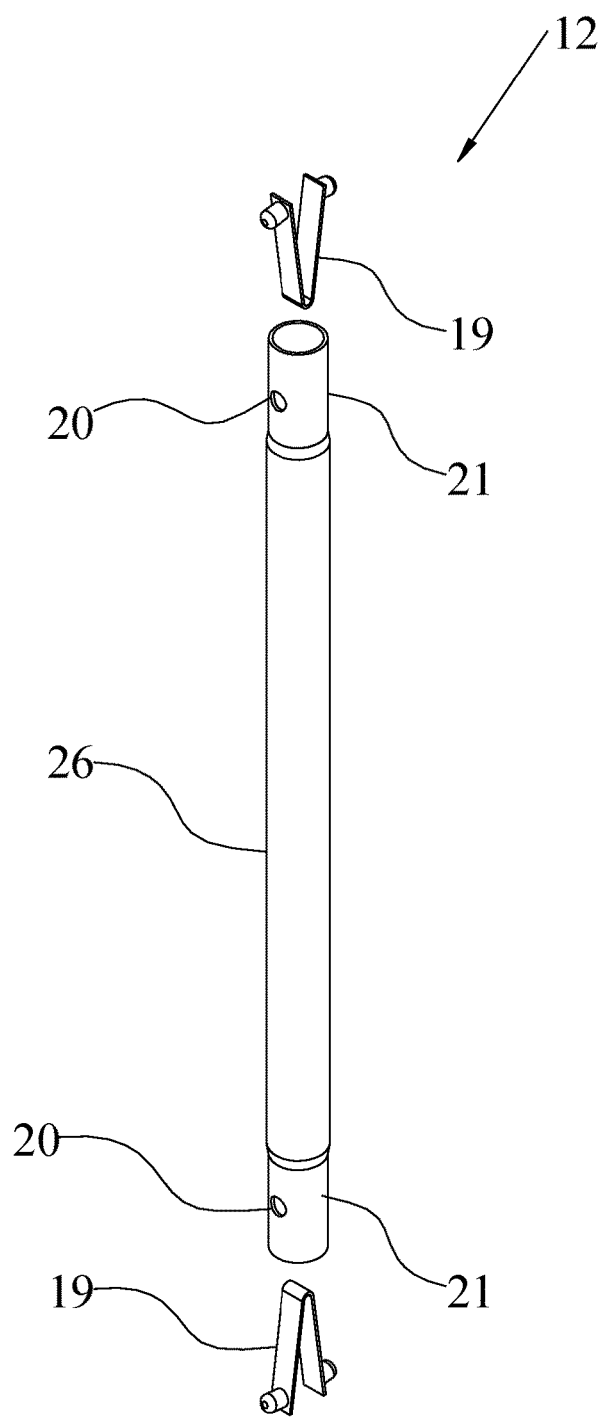
FIG. 10A is an exploded view showing detail of the components of the main post apparatus of the present invention.

FIG. 10 is a perspective view of the main post apparatus 12 whereas FIG. 10A is an exploded view of showing the relationship between components including main post apparatus 12 with concentric reduced ends 21, and the main terminal post 26. In addition, the main post apparatus 12 can be connected or disconnect to the end rail sleeve 14 by engaging the button spring clip 19.

Figure 11:
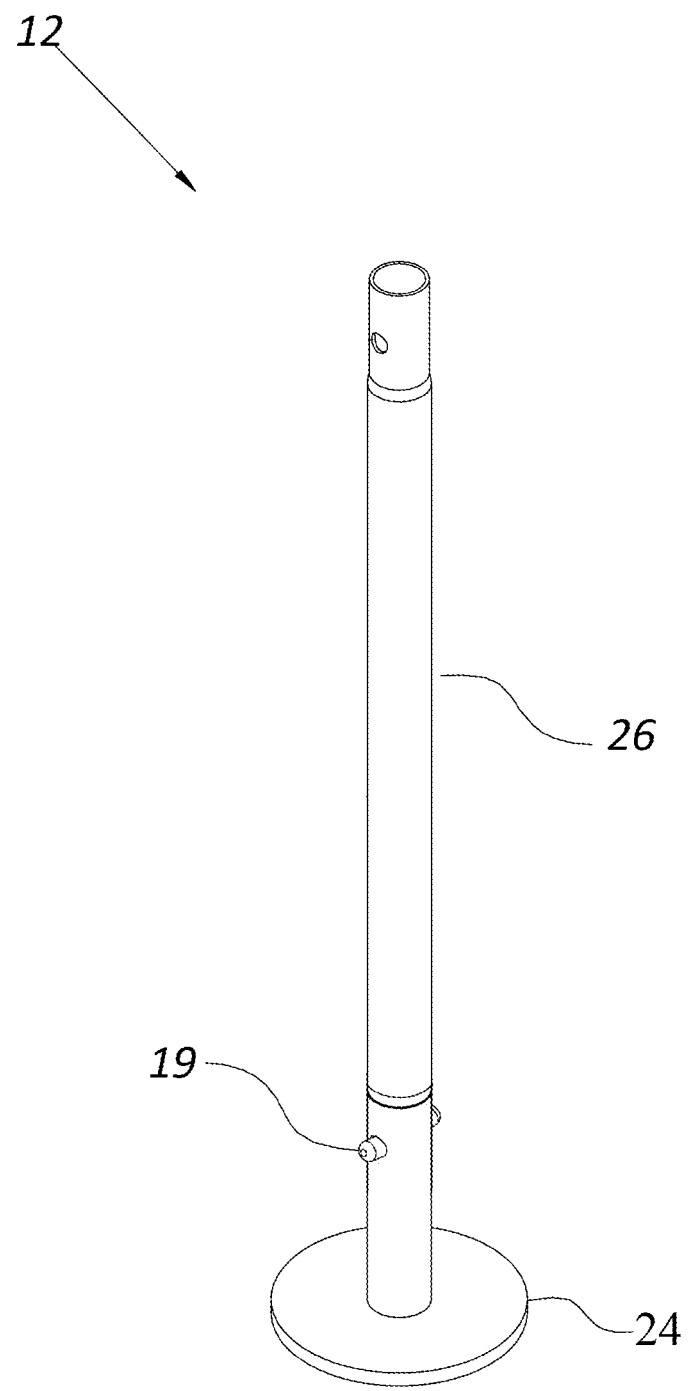
FIG. 11 is a perspective view of the base post apparatus, as shown with the base leg attached to the adjustable base post according to the present invention.
Figure 12:
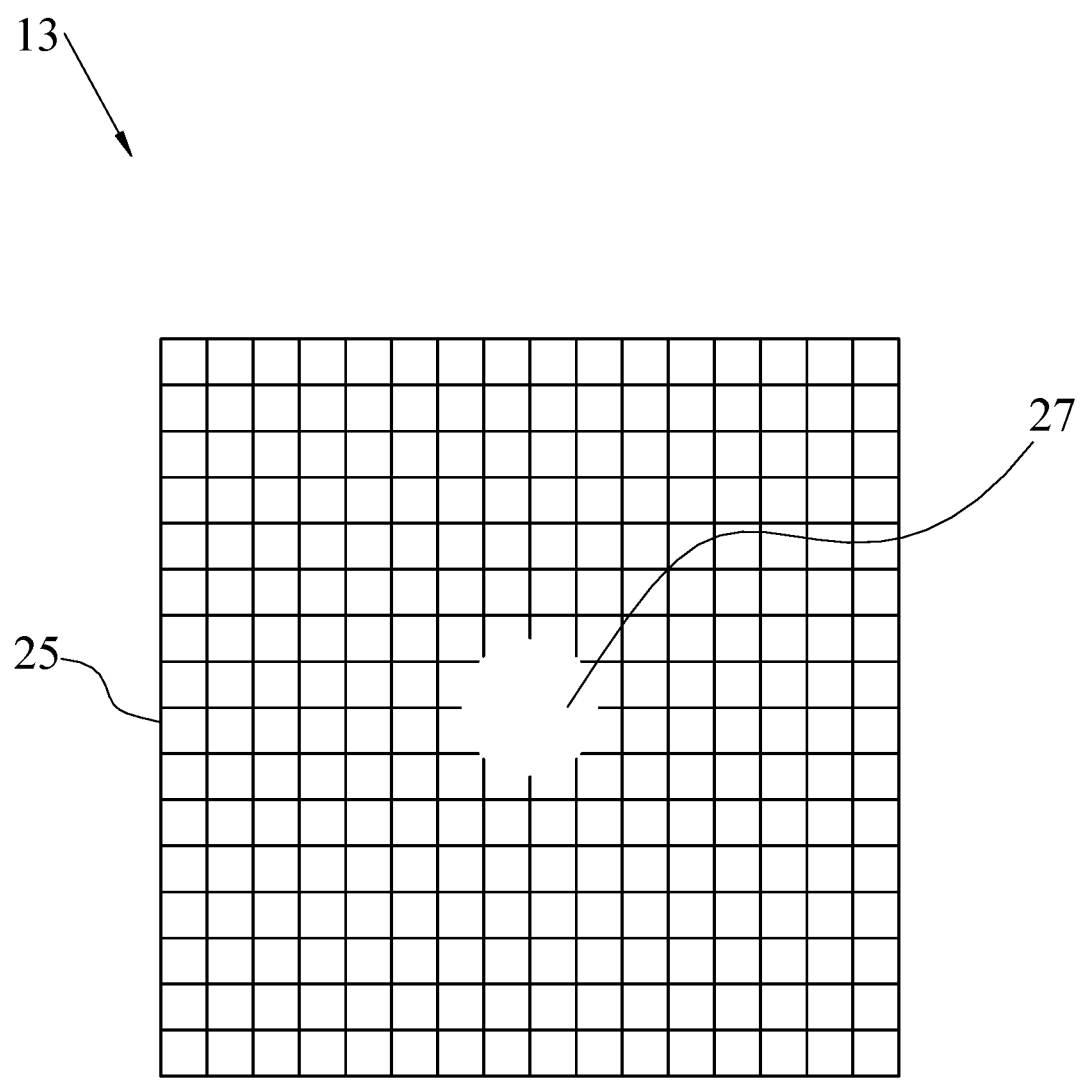
FIG. 12 is top view of the wire mesh shown in FIG. 7.

As showing in FIG. 11 is a perspective view of the main post apparatus 12 whereas the base leg 24 inserted in the main post apparatus 12. In accordance with embodiment of the present invention, FIG. 12 is a top view of the wire mesh 13 with the center ring opening 27, showing the welds 25 located at each crossing of intersecting of individual wire.

Figure 13:
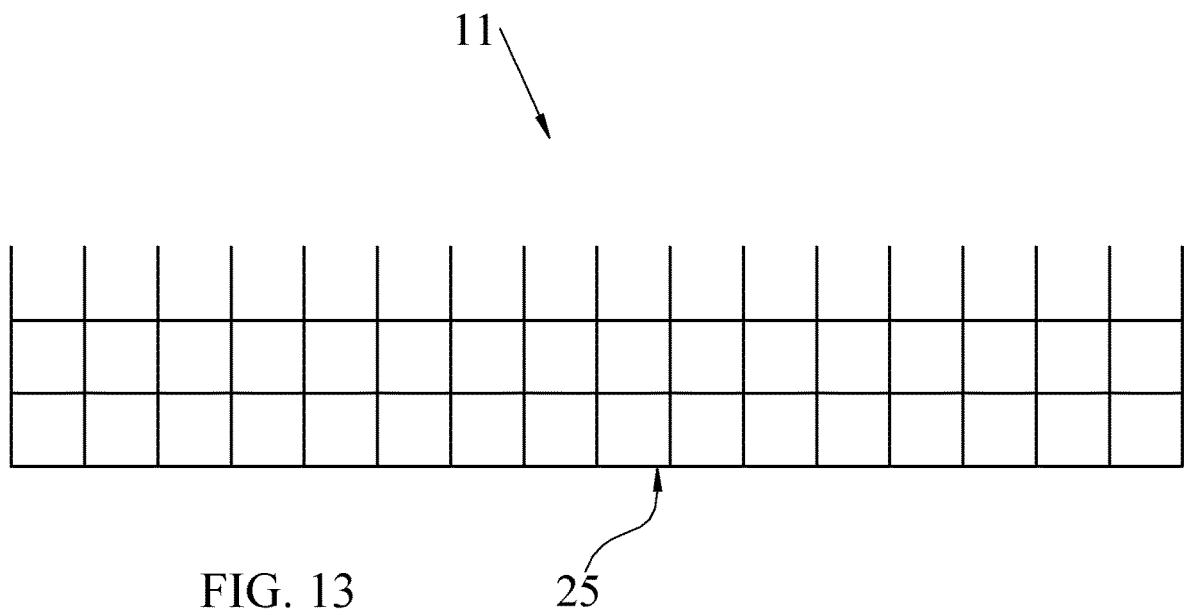
FIG. 13 is a front view of the trellis side panel according to the present invention.
Figure 13A:
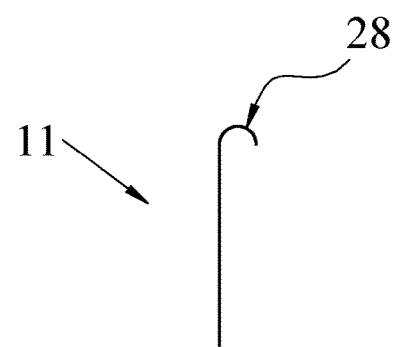
FIG. 13A is a side view of the trellis side panel curve end shown in FIG. 13.

Moreover, as shown in FIG. 13 where a more elaborate plant support structure is necessary, such as, for vines, a trellis side panel 11 may be set on the side of the main trellis assembly 2 (not shown). The trellis side panel 11 may be connected at the upper ends by means of multiple curve wire ends 28 and by other welding 25 each crossing of intersecting of individual wire. The trellis side panel 11 may comprise a light, medium or heavy gauge steel wire covered with galvanizing, an aluminum coating, vinyl jacketing, or other weather-proofing methods, and is in the noted illustrated pattern, or in a mesh pattern to suit the particular application.

Figure 14:
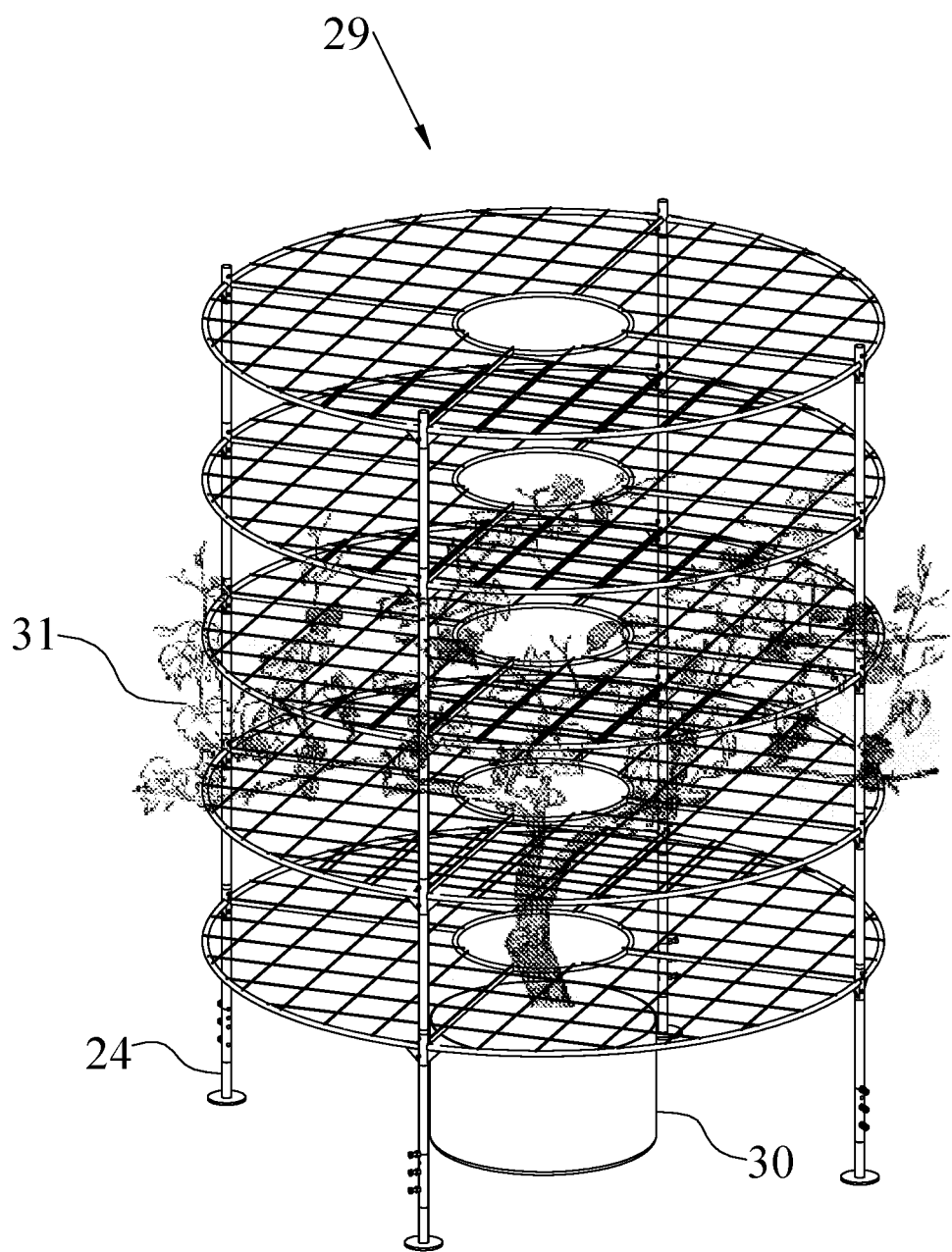
FIG. 14 is a perspective view of the stackable trellis support system in the preferred embodiment set up in a round trellis assembly configuration for plant support.

The present invention shown in FIG. 14 illustrates another version of the round trellis support system 29 shown assembled with a grape vine 31 growing out of a canvas pot 30 by base leg 24 of the present invention.

Figure 15:
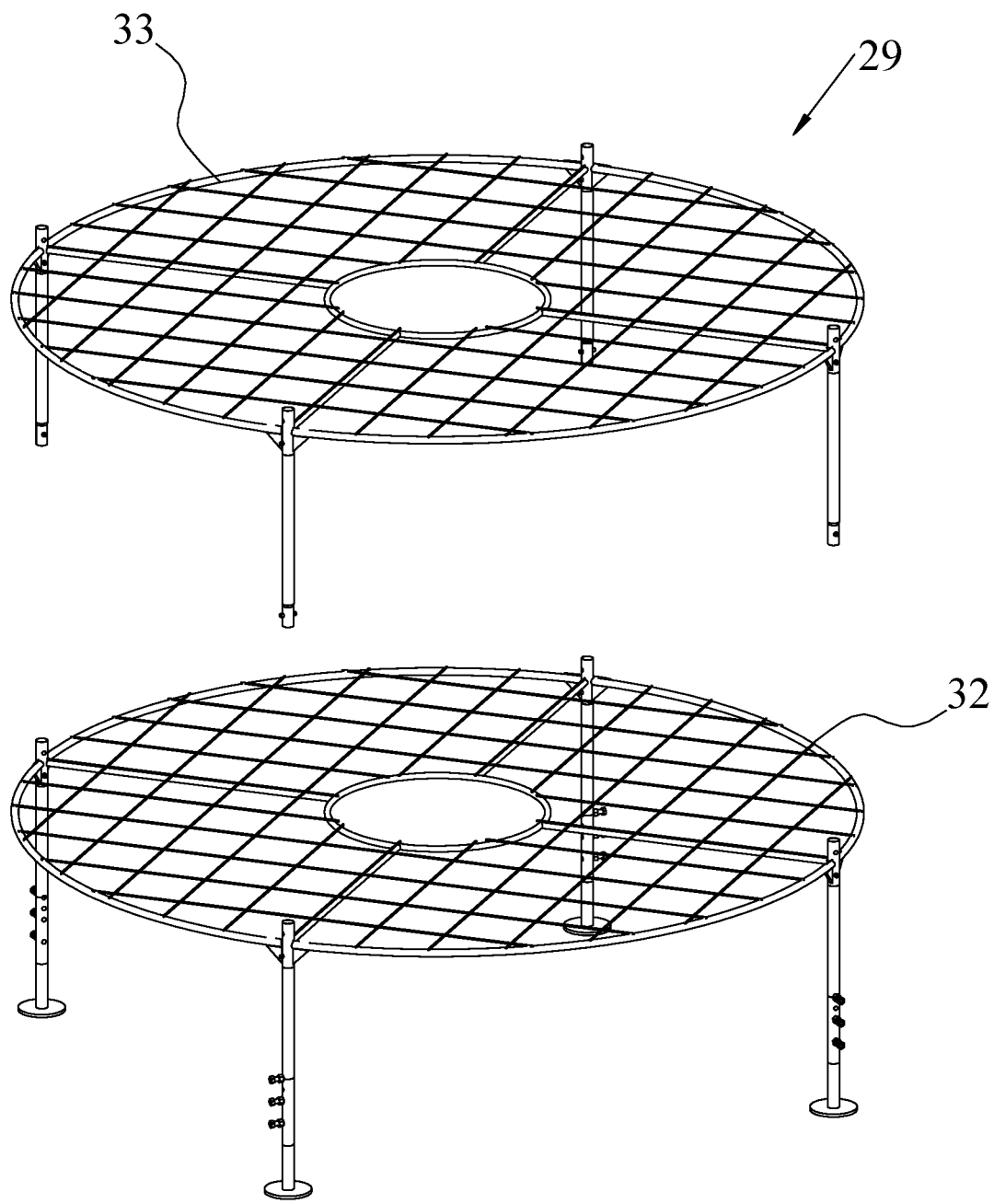
FIG. 15 is another perspective view of the round trellis assembly of FIG. 14; comprises two main sections according to the present invention.

As shown in FIG. 15, is a perspectives view of the round trellis support system 29 comprises a first round trellis base assembly and a second round trellis main assembly 32, 33 respectively, which are configured for removable attachment together. Although a first round trellis base assembly and a second round trellis main assembly 32, 33 are shown, further round trellis main assembly 33 may be used to assemble round trellis support system 29, such as a third or fourth round trellis main subassembly 32.

Figure 16:
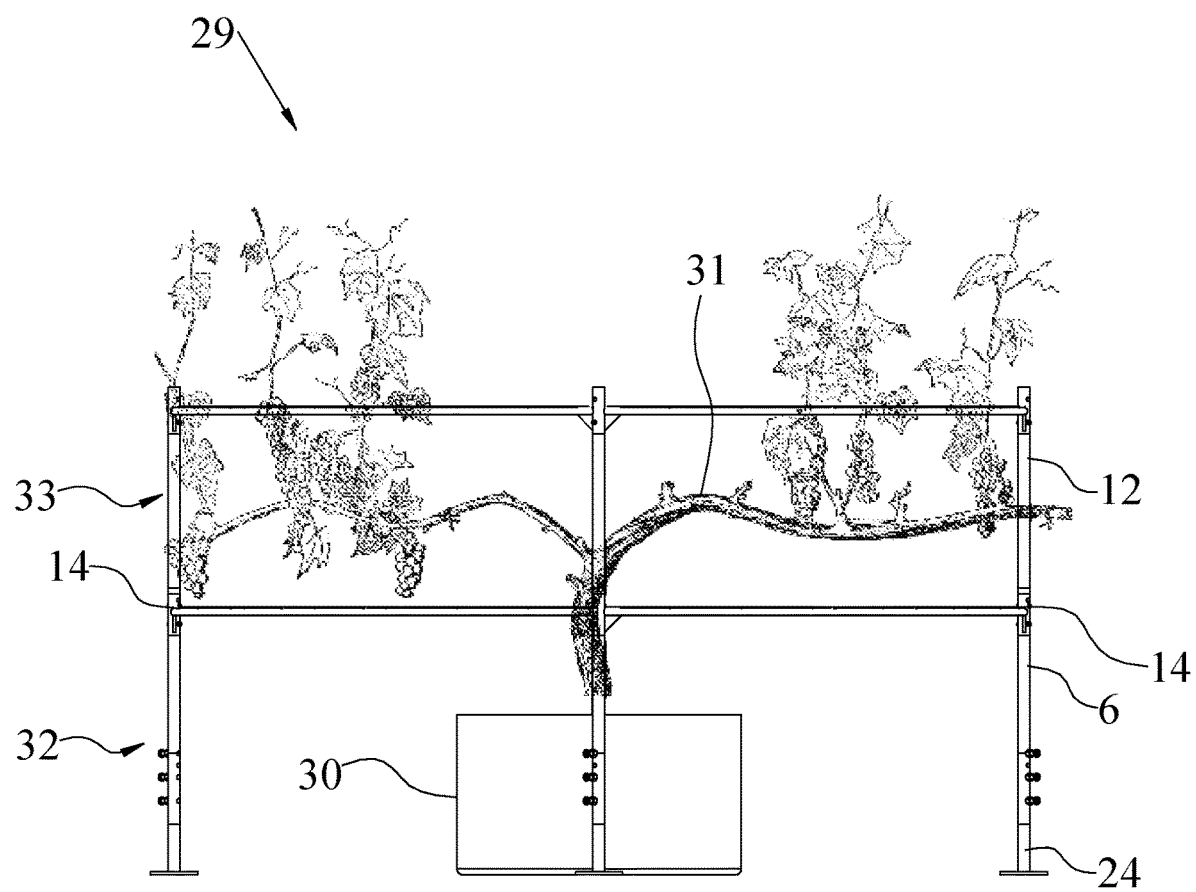
FIG. 16 is a front view of the round trellis assembly of FIG. 14 and FIG. 15 showing the round base and round main trellis assembly of the present invention installed in the ground.

As substantially, shown in FIG. 16 a front view of the round trellis support system 29 shown with a grape vine 31, consists of a round trellis base subassembly 32, having the base posts apparatus 6 attached to the base leg 24 located on the ground and a round trellis main assembly 33 interconnected in a stackable fashion. Each of the round trellis base assembly 32 and round trellis main assembly 33 includes a plurality of base post apparatus 6 and main post apparatus 12 configured to align and connect together when the end rail sleeve 14 and the bottom of the main post apparatus 12 joined together.

Figure 17:
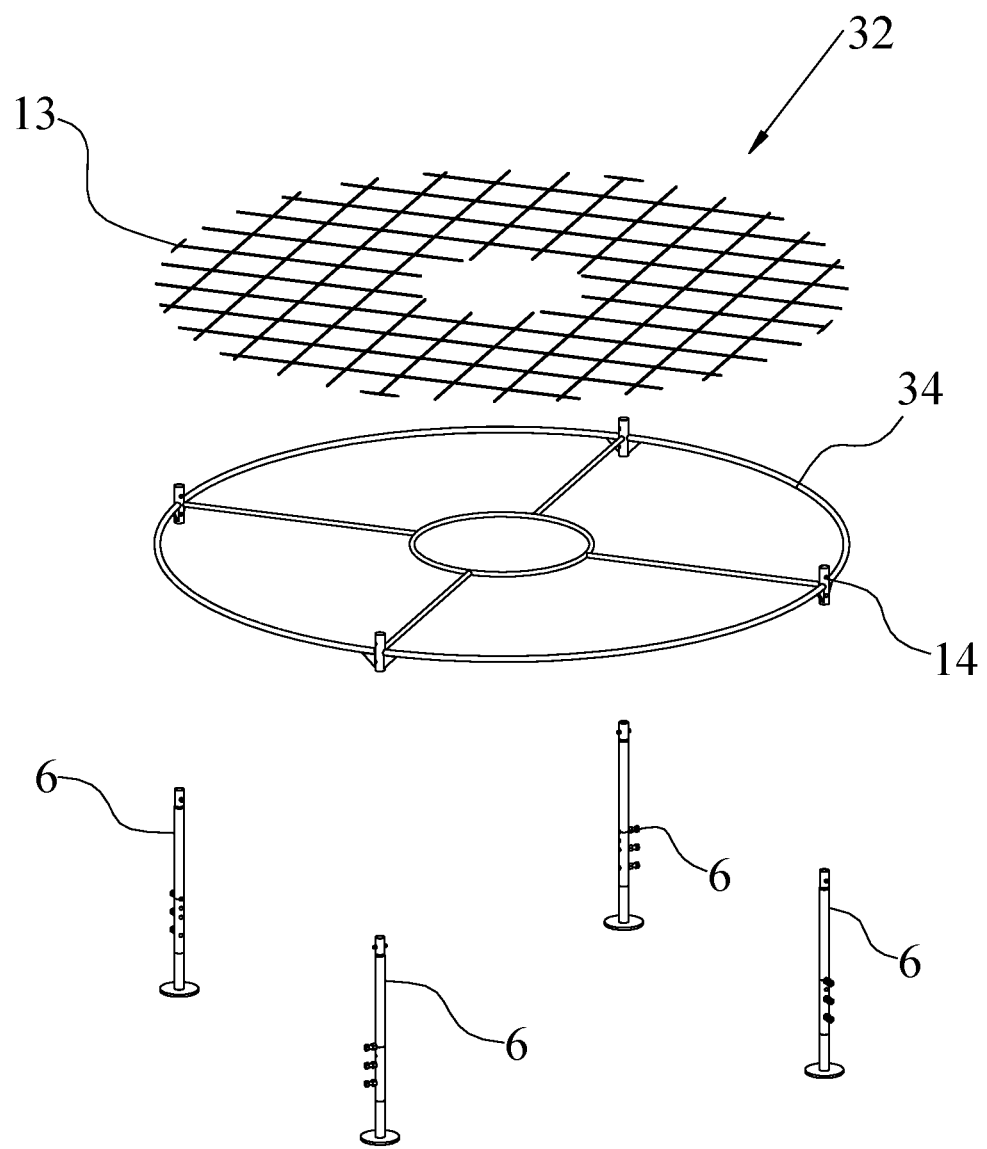
FIG. 17 is an exploded perspective view of the round trellis subassembly shown in FIG. 14.
Figure 18:
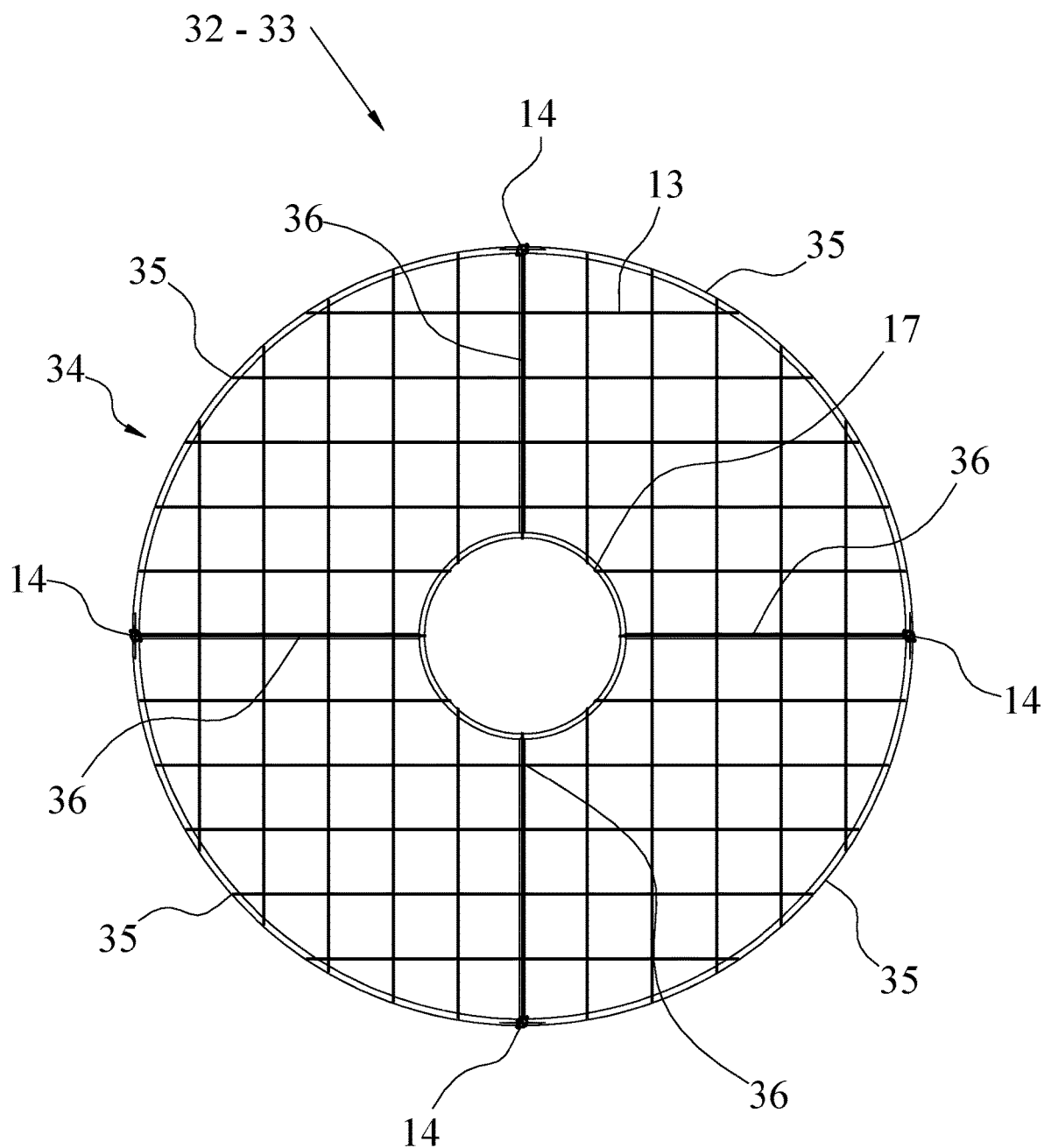
FIG. 18 is a top view of the round trellis assembly, as shown with the wire mesh attached to the wire mesh frame.

As Shown FIG. 17, the round trellis base assembly 32 and round trellis main assembly 33 (not showed) is actually made up of a plurality of separate component pieces. Each are substantially identical except for the base post apparatus 6 and the main post apparatus 12 (not showed). The round trellis base assembly 32 includes a round wire mesh frame 34 having a wire mesh 13 in a square welded pattern to which the round wire mesh frame 34 and wire mesh 13 which may be bonded to each other by welding, brackets, and/or other methods of securement. Located on the outside surface of the round wire mesh frame 34 corners is the end rail sleeve 14 component designed to receive a base post apparatus 6 or main post apparatus 12 (not showed). The rail sleeve 14 and round wire mesh frame 34 are welded together to provide a strong connection between the round wire mesh frame 34 and the base post apparatus 6. As best seen in FIG. 18, a top view of the round trellis base assembly 32 and round trellis main assembly 33 includes four substantially round top rails 35 each having four rail end sleeves 14 and four round cross rail 36 with a center ring 17 completing the round wire mesh frame 34. As generally understood, both the round trellis base assembly 32 and round trellis main assembly 33 include a wire mesh 13 in a square welded pattern that is attached to the round wire mesh frame 34. Wire mesh 13 can be of many standard types, that might be selected from light, medium or heavy gauge steel wire covered with galvanizing, an aluminum coating, vinyl jacketing, or other weather-proofing methods, and is in the noted illustrated pattern or in a mesh pattern to suit the particular application.

Figure 19:
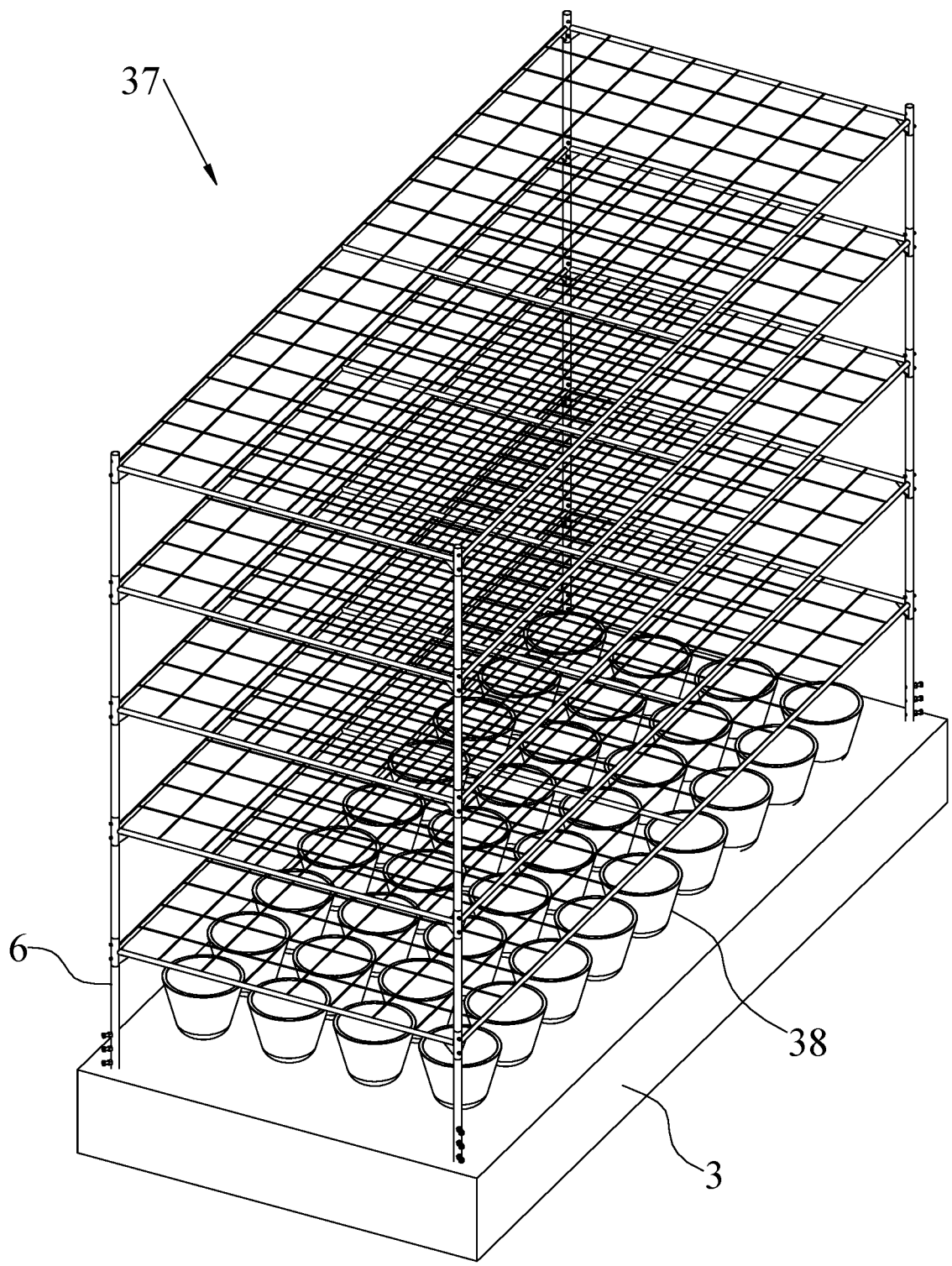
FIG. 19 is a perspective view of the stackable trellis support system in the preferred embodiment set up in a rectangle trellis assembly configuration for plant support.

The present invention shown in FIG. 19 illustrate another version of the rectangle trellis support system 37 shown assembled with rows of flower pots 38 including plants 41 and inserted into the ground 3 by base post apparatus 6 of the present invention.

Figure 20:
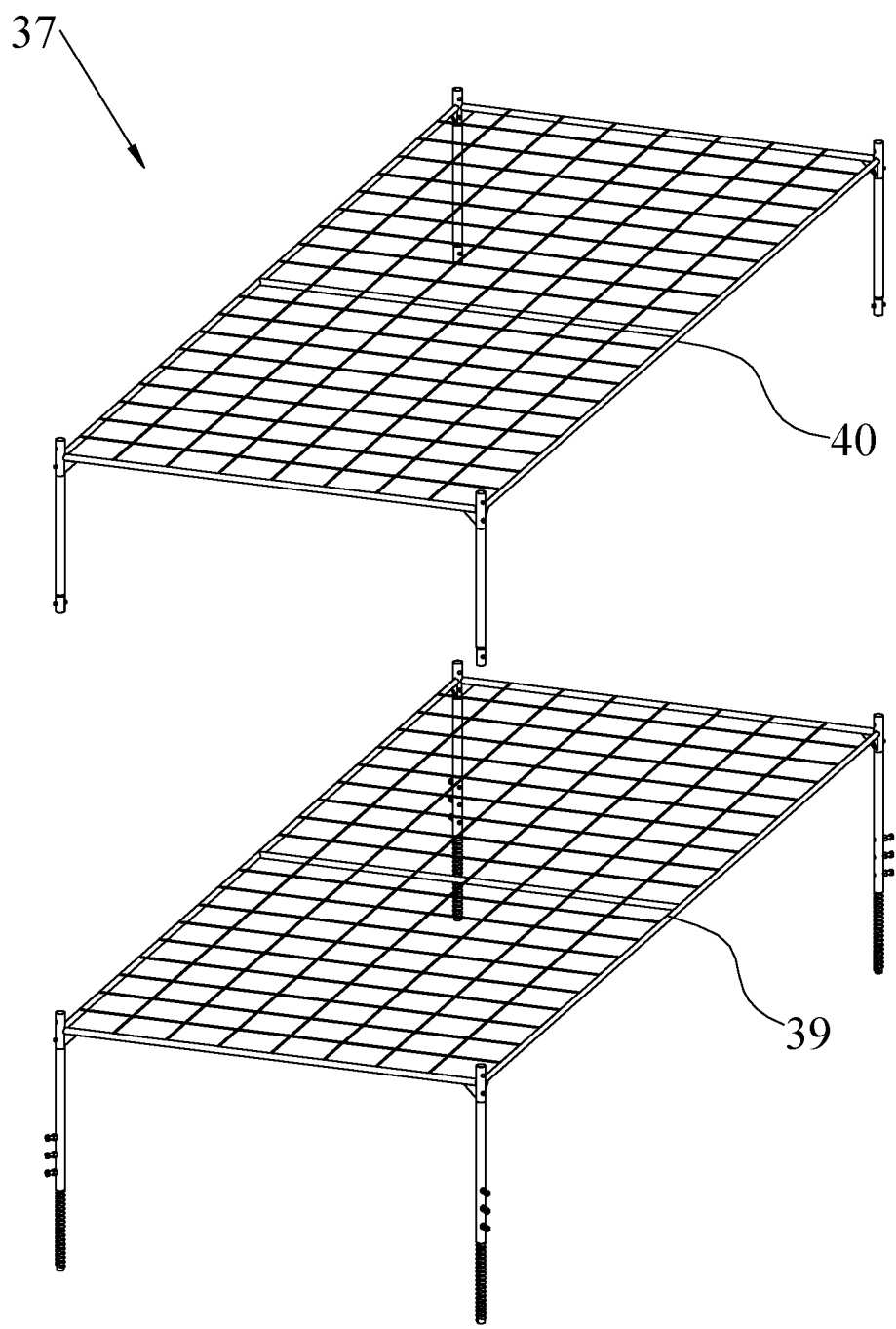
FIG. 20 is another perspective view of the rectangle trellis assembly of FIG. 19; comprises two main sections according to the present invention.

As shown in FIG. 20, is a perspectives view of the rectangle trellis support system 37 comprises a first rectangle trellis base assembly and a second rectangle trellis main assembly 39, 40 respectively, which are configured for removable attachment together. Although a first rectangle trellis base assembly and a second rectangle trellis main assembly 39, 40 are shown, further rectangle trellis main assembly 40 may be used to assemble rectangle trellis support system 37, such as a third or fourth rectangle trellis main assembly 40.

Figure 21:
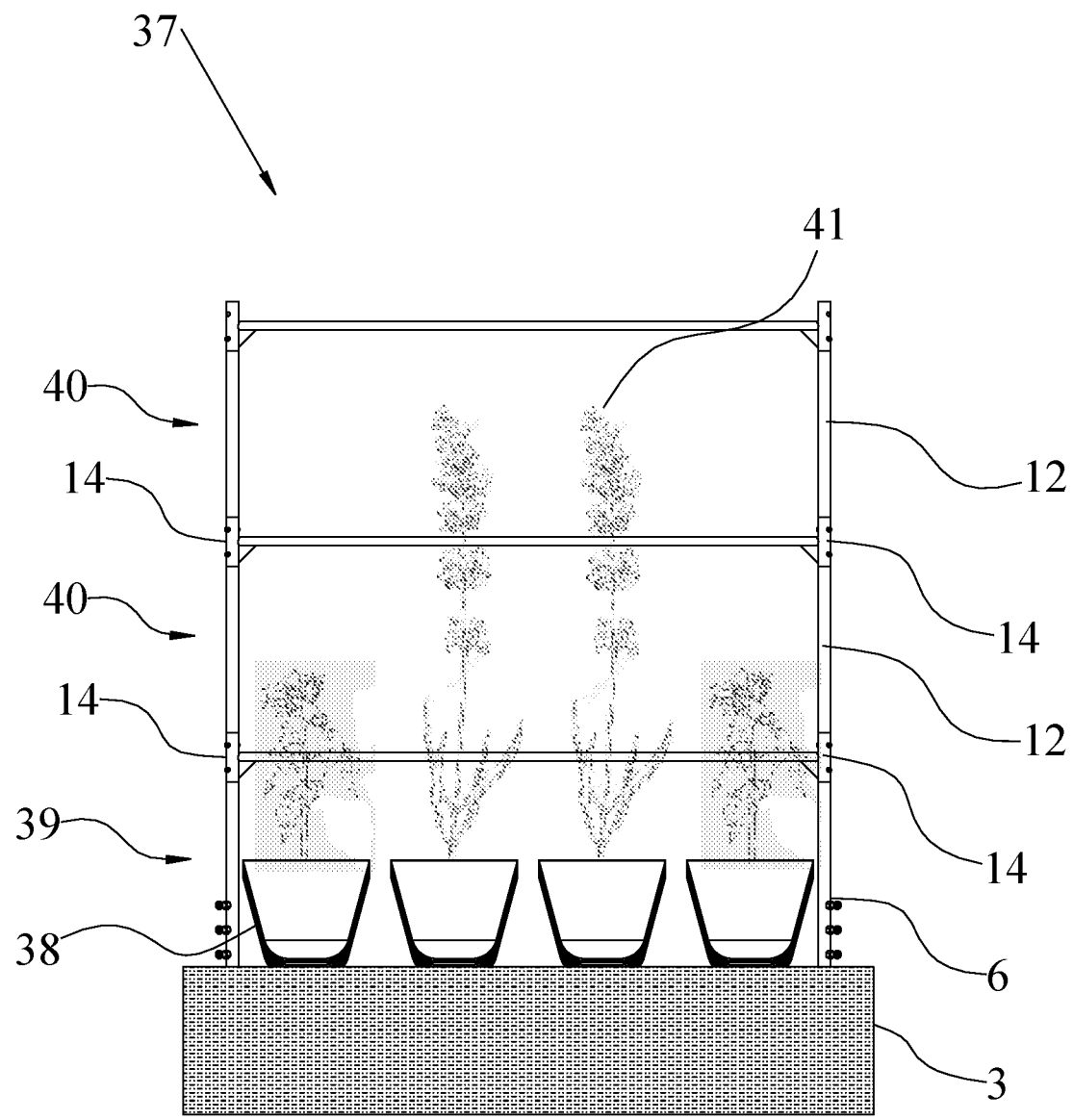
FIG. 21 is a front view of the rectangle trellis assembly of FIG. 19 and FIG. 20 showing the rectangle base and rectangle main trellis assembly of the present invention installed in the ground.

As substantially, shown in FIG. 21 a front view of the rectangle trellis support system 37 consists of a rectangle trellis base sub assembly 39, having the base posts apparatus 6 attached to the anchoring rebar stakes 8 (not shown) located on the ground and a rectangle trellis main assembly 40 interconnected in a stackable fashion. Each of the rectangle trellis base assembly 39 and rectangle trellis main assembly 40 includes a plurality of base post apparatus 6 and main post apparatus 12 configured to align and connect together when the end rail sleeve 14 and the bottom of the main post apparatus 12 joined together.

Figure 22:
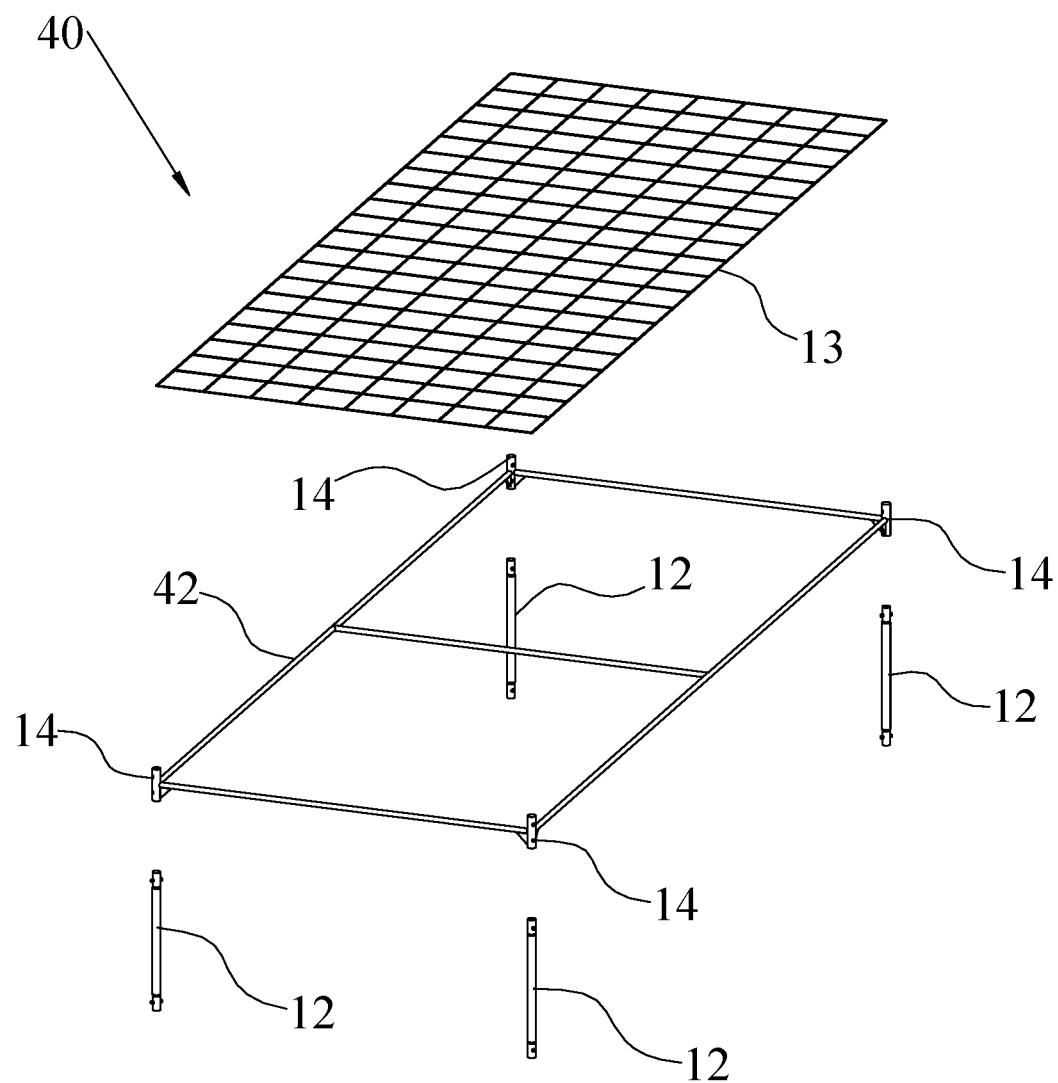
FIG. 22 is an exploded perspective view of the rectangle trellis assembly shown in FIG. 19.

As Shown FIG. 22, the rectangle trellis main assembly 40 and rectangle trellis base assembly 39 (not shown) is actually made up of a plurality of separate component pieces. Each are substantially identical except for the main post apparatus 12 and the base post apparatus 6 (not shown). The rectangle trellis base assembly 39 (not shown) includes a rectangle wire mesh frame 42 having a wire mesh 13 in a rectangle welded pattern to which the rectangle wire mesh frame 42 and wire mesh 13 which may be bonded to each other by welding, brackets, and/or other methods of securement. Located on the outside surface of the rectangle wire mesh frame 42 corners is the end rail sleeve 14 component designed to receive a main post apparatus 12 or base post apparatus 6 (not shown). The rail sleeve 14 and the rectangle wire mesh frame 42 are welded together to provide a strong connection between the rectangle wire mesh frame 42 and the main post apparatus 12.

Figure 23:
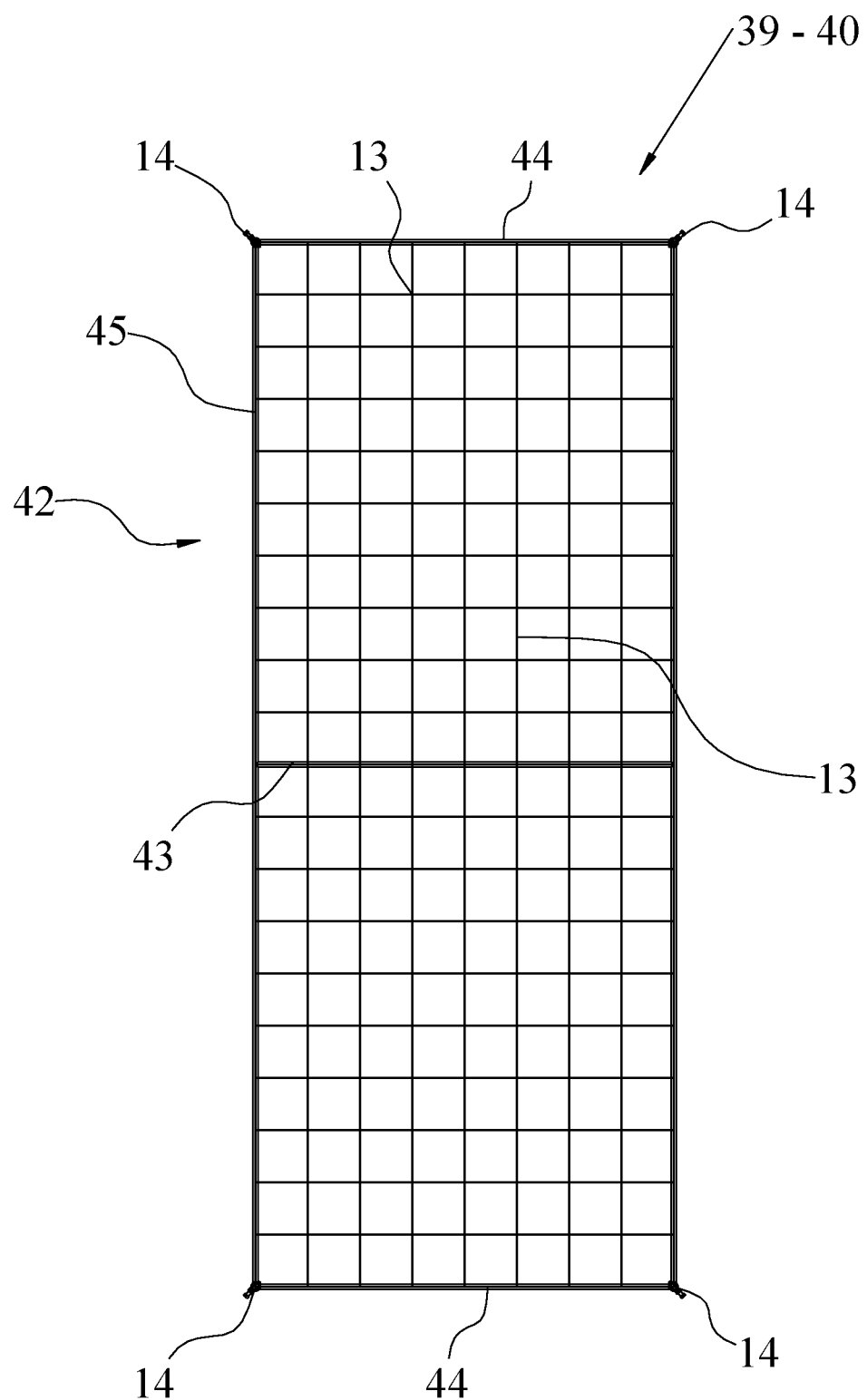
FIG. 23 is a top view of the rectangle trellis assembly, as shown with the wire mesh attached to the wire mesh frame.

As best seen in FIG. 23, a top view of the rectangle trellis base assembly 39 (not showed) and rectangle trellis main subassembly 40 includes two substantially rectangle top rails 44 and two rectangle side rail 45 having four rail end sleeves 14 and a rectangle cross rail 43 completing the rectangle wire mesh frame 42. As generally understood, both the rectangle trellis base assembly 39 and rectangle trellis main assembly 40 include a wire mesh 13 in a rectangle welded pattern that is attached to the rectangle wire mesh frame 42. Wire mesh 13 can be of many standard types, that might be selected from light, medium or heavy gauge steel wire covered with galvanizing, an aluminum coating, vinyl jacketing, or other weather-proofing methods, and is in the noted illustrated pattern or in a mesh pattern to suit the particular application.

What is claimed is:

1. A stackable trellis support system comprising:
    a) more than one trellis assembly, each of said trellis assemblies is square, circular, or rectangular in shape and comprises:
        four horizontal steel top rails,
        four horizontal steel cross rails,
        four vertical tubular end rail sleeves each having a vertical opening, wherein each of said vertical tubular end rail sleeves is welded to two of said horizontal steel top rails and to one of said horizontal steel cross rails;
        a steel ring welded to said four horizontal steel cross rails and centered within said trellis assembly,
        a square-patterned welded wire mesh having said shape of said trellis assembly and fitted over said trellis assembly, said square-patterned welded wire mesh has an opening aligned with said steel ring;
        vertical square-patterned welded wire mesh panels with multiple curved wire ends mounted perpendicularly on said four horizontal steel top rails;
    b) four telescoping base post apparatus to anchor said stackable trellis support system to the ground, each of said adjustable base post apparatus comprising:
        A rebar stake; and
        A base post that fits over said rebar stake and that can be inserted into said vertical openings of said trellis assembly's vertical tubular end rail sleeves; and
    c) multiple main post apparatus that can be inserted into said vertical openings of said vertical tubular end rail sleeves of said trellis assemblies.

* * * * *